United States Patent
Shah et al.

(10) Patent No.: US 12,067,857 B1
(45) Date of Patent: Aug. 20, 2024

(54) SYSTEM AND METHOD FOR REDUCING A THREAT FOOTPRINT OF AN AREA-OF-INTEREST

(71) Applicant: University of South Florida, Tampa, FL (US)

(72) Inventors: Ankit Shah, Tampa, FL (US); Soumyadeep Hore, Tampa, FL (US); Dinesh Sharma, Tampa, FL (US)

(73) Assignee: University of South Florida, Tampa, FL (US)

( * ) Notice: Subject to any disclaimer, the term of this patent is extended or adjusted under 35 U.S.C. 154(b) by 245 days.

(21) Appl. No.: 17/559,401

(22) Filed: Dec. 22, 2021

Related U.S. Application Data

(60) Provisional application No. 63/199,400, filed on Dec. 23, 2020.

(51) Int. Cl.
| | |
|---|---|
| *G08B 21/02* | (2006.01) |
| *G06F 18/21* | (2023.01) |
| *G06N 3/04* | (2023.01) |
| *G06N 3/08* | (2023.01) |
| *G06Q 90/00* | (2006.01) |

(52) U.S. Cl.
CPC ........... *G08B 21/02* (2013.01); *G06F 18/217* (2023.01); *G06N 3/04* (2013.01); *G06N 3/08* (2013.01); *G06Q 90/20* (2013.01)

(58) Field of Classification Search
CPC ........ G08B 21/02; G06F 18/217; G06N 3/04; G06N 3/08; G06Q 90/20
See application file for complete search history.

(56) References Cited

U.S. PATENT DOCUMENTS

| | | | |
|---|---|---|---|
| 8,255,262 B2 | 8/2012 | Siegel et al. | |
| 9,726,460 B2* | 8/2017 | Hershey | F41H 11/00 |
| 10,210,748 B2 | 2/2019 | Lamb et al. | |
| 10,345,767 B2 | 7/2019 | Li | |
| 2016/0070674 A1* | 3/2016 | Hershey | F41H 11/02 703/2 |
| 2016/0253590 A1* | 9/2016 | Hershey | F41H 11/00 706/14 |
| 2018/0038669 A1* | 2/2018 | Hershey | F41H 11/02 |
| 2018/0075168 A1* | 3/2018 | Tiwari | H04N 23/698 |
| 2021/0073449 A1* | 3/2021 | Segev | G06F 30/27 |
| 2022/0013222 A1* | 1/2022 | Marotta | G01R 19/1659 |
| 2022/0108622 A1* | 4/2022 | Derickson | G06Q 10/06 |

FOREIGN PATENT DOCUMENTS

KR 101877294 B1 7/2018

\* cited by examiner

*Primary Examiner* — Rufus C Point
(74) *Attorney, Agent, or Firm* — Molly L. Sauter; Smith & Hopen, P.A.

(57) ABSTRACT

A method for reducing a threat footprint for an area-of-interest by, determining a base risk score for an area-of-interest, deriving a graphical representation of the area-of-interest and one or more defense strategies for the area-of-interest, training an adversarial reinforcement learning agent to identify one or more successful attack paths on the graphical representation of the area-of-interest that are effective in bypassing the one or more defense strategies for the area-of-interest, determining an active risk score based upon the one or more successful attack paths identified by the adversarial reinforcement learning agent and determining one or more mitigation actions that will reduce the active risk score for the area-of-interest based upon the base risk score and one or more predetermined resource constraint.

20 Claims, 23 Drawing Sheets

Algorithm 1 Adversarial Learning Algorithm

- Input : Size of the graph (AoI) with number of vertices and edges, weights on edges indicating time units taken to traverse among the vertices, total number of episodes $E$, epsilon, maximum number of epochs $T$
- Output: Learned Q value function for all state-action pairs Initial steps:
Designing the state and action space: the dimension of the state space is equal to the number of nodes + 1, action space has the same dimension as the number of vertices on the graph
initialize memory
initialize Q values for all state-action pairs to 0
for *episodes = 1 to E*, do
    initialize starting state of the adversary by picking a random vertex from the graph
set time = 0
set done = False
while *done = False* do
    set flag = 0
    while *flag = 0* do
        apply *epsilon-greedy* strategy to select actions, with a small probability, *epsilon*, the agent takes a sub-optimal random action
        Action is executed in the defender's simulator and the next state is generated
    end
    update time = time + time taken to reach next state
if *time >= T* then
    done = True
end
if *the adversary gets caught by the defender's strategy* then
    reward = -100
    done = True
end
if *the adversary reaches a high-value node* then
    reward = 100
    done = True
end
if *the adversary remains undetected* then
    reward = 1
end
Save the current state, action, reward and next state information in memory
Randomly sample experiences from memory
Perform a gradient descent step
Update Q value for the state-action pair
  end
end

FIG. 6

With Optimal Actions

| Start Nodes | No. of Starts | No. of Wins | Percent Win | Max Win Time | Min Win Time | Avg Win Time | Actions to Win | No. of Guards | Most Used Attack Path |
|---|---|---|---|---|---|---|---|---|---|
| 1 | 55555 | 44477 | 80.1 | 1841 | 362 | 738 | 4.19 | 3 | [1, 1, 2, 8, 19] |
| 2 | 55555 | 43330 | 78 | 2393 | 409 | 778 | 5.23 | | [2, 1, 10, 6, 19] |
| 7 | 55555 | 42457 | 76.4 | 2452 | 383 | 810 | 4.43 | | [7, 13, 17, 19] |
| 8 | 55555 | 36974 | 66.6 | 3170 | 517 | 931 | 3.98 | | [8, 17, 19] |
| 11 | 55555 | 46656 | 84 | 3236 | 424 | 811 | 4.15 | | [11, 6, 15, 11, 7, 8, 8, 19] |
| 12 | 55555 | 36879 | 66.4 | 3115 | 391 | 725 | 5.6 | | [12, 13, 6, 12, 19] |
| 13 | 55555 | 45444 | 81.8 | 2402 | 454 | 640 | 3.38 | | [13, 17, 19] |
| 16 | 55555 | 47323 | 85.2 | 1833 | 421 | 694 | 3.08 | | [16, 17, 19] |
| 18 | 55555 | 44338 | 79.8 | 3023 | 456 | 687 | 5.13 | | [18, 7, 8, 19] |
| | 500000 | 387878 | | | | | | | |

FIG. 11A

| Start Nodes | No. of Starts | No. of Wins | Percent Win | Max Win Time | Min Win Time | Avg Win Time | Actions to Win | No. of Guards | Most Used Attack Path |
|---|---|---|---|---|---|---|---|---|---|
| 1 | 62500 | 38830 | 62.1 | 2026 | 399 | 643 | 5.41 | 6 | [1, 12, 12, 13, 5, 19] |
| 2 | 62500 | 36283 | 58.1 | 1637 | 474 | 737 | 5.13 | | [2, 16, 8, 19] |
| 7 | 62500 | 40977 | 65.6 | 1762 | 473 | 550 | 4.41 | | [7, 13, 8, 19] |
| 8 | 62500 | 41844 | 67 | 917 | 435 | 544 | 3.4 | | [8, 17, 19] |
| 12 | 62500 | 45066 | 72.1 | 1767 | 466 | 692 | 4.11 | | [12, 13, 5, 19] |
| 13 | 62500 | 42810 | 68.5 | 1836 | 469 | 480 | 4 | | [13, 17, 19] |
| 16 | 62500 | 44919 | 71.9 | 1711 | 443 | 473 | 3.03 | | [16, 17, 19] |
| 18 | 62500 | 43649 | 69.8 | 940 | 462 | 511 | 4.26 | | [18, 7, 8, 10, 19] |
| | 500000 | 334378 | | | | | | | |

FIG. 11B

| Start Nodes | No. of Starts | No. of Wins | Percent Win | Max Win Time | Min Win Time | Avg Win Time | Actions to Win | No. of Guards | Most Used Attack Path |
|---|---|---|---|---|---|---|---|---|---|
| 1 | 125000 | 93763 | 75 | 943 | 422 | 434 | 4.06 | 12 | [1, 18, 5, 18, 18, 19] |
| 2 | 125000 | 89062 | 71.2 | 839 | 507 | 515 | 4.17 | | [2, 4, 13, 13, 19] |
| 13 | 125000 | 102222 | 81.8 | 943 | 512 | 649 | 3.024 | | [13, 17, 19] |
| 16 | 125000 | 96316 | 77.1 | 867 | 460 | 569 | 3.094 | | [16, 16, 16, 12, 10, 17, 19] |
| | 500000 | 381363 | | | | | | | |

FIG. 11C

| Graph Size | Connectivity | Win % Training | Win % Testing | Max Win Time | Min Win Time | Avg Win Time | No. of Guards |
|---|---|---|---|---|---|---|---|
| 25 | 0.3 | 70.63 | 100 | 5798 | 489 | 705 | |
| | 0.6 | 82.7 | 100 | 3810 | 528 | 1006.77 | |
| | 1 | 93.28 | 100 | 2906 | 464 | 794.98 | 3 |
| 50 | 0.3 | 59.05 | 92.1 | 3884 | 450 | 663.35 | |
| | 0.6 | 60.32 | 90.3 | 3920 | 432 | 834.41 | |
| | 1 | 91.22 | 97.5 | 4870 | 307 | 663.04 | |

SYSTEM AND METHOD FOR REDUCING A THREAT FOOTPRINT OF AN AREA-OF-INTEREST

CROSS-REFERENCE TO RELATED APPLICATIONS

This application claims priority to U.S. Provisional Patent Application No. 63/199,400, filed Dec. 23, 2020, and entitled "ADVERSARIAL LEARNING METHOD FOR SECURING SOFT TARGETS AND CROWDED PLACES", which is herein incorporated by reference in its entirety.

BACKGROUND OF THE INVENTION

Indoor and outdoor spaces have become preferred soft targets for malicious activities. Securing these publicly accessible soft targets by reducing their threat footprint is of paramount importance to society. To achieve this, security advisors conduct risk assessment of an area-of-interest (AoI) or a venue to identify potential vulnerabilities that can be exploited by a malicious actor. Current approaches to risk assessment and management are manual and rely on the expertise of the security advisors. There does not exist a generalizable technology-based method for vulnerability identification and remediation for the soft targets and crowded places.

Accordingly, there is a need for a system and method that provides a technology-based solution that solves the technical problem of being able to identify vulnerability in an area-of-interest and to determine mitigation actions for the area-of-interest that will reduce the threat.

SUMMARY OF THE INVENTION

In various examples, the present invention provides a system and method that solves a technical problem of being able to identify vulnerability in an area-of-interest and to determine mitigation actions for the area-of-interest that will reduce the threat to the area-of-interest.

The technological solution provided by the various embodiments of the present invention overcomes the shortcomings in the art by identifying the vulnerabilities in the area-of-interest and security strategies employed by the defender (i.e., venue owner or security advisor). The artificial intelligence-based technology conducts an exploratory analysis of possible attacks on the area-of-interest. The technology then identifies potential attack paths and then prescribes remediations to reduce the threat footprint of the area-of-interest.

In one embodiment, a method for reducing a threat footprint for an area-of-interest is provided. The method includes, determining a base risk score for an area-of-interest, deriving a graphical representation of the area-of-interest and one or more defense strategies for the area-of-interest and training an adversarial reinforcement learning agent to identify one or more successful attack paths on the graphical representation of the area-of-interest that are effective in bypassing the one or more defense strategies for the area-of-interest. The method further includes, determining an active risk score based upon the one or more successful attack paths identified by the adversarial reinforcement learning agent and determining one or more mitigation actions that will reduce the active risk score for the area-of-interest based upon the base risk score and one or more predetermined resource constraint, wherein reducing the active risk score reduces a threat footprint for the area-of-interest.

In particular, determining the base risk score comprises identifying critical level factors for the area-of-interest, identifying recovery level factors for the area-of-interest, identify protection level factors for the area-of-interest, identifying potential impact level factors for the area-of-interest, assigning weights to the critical level factors, the recovery level factors, the protection level factors and the potential impact level factors and determining the base risk score based upon the weighted critical level factors, the recovery level factors, the protection level factors and the potential impact level factors.

The critical level factors may include one or more of a number of transit stations within the area-of-interest, a crime rate for the area-of-interest and a number of entry/exit points for the area-of-interest.

The recovery level factors for the area-of-interest may include a number of fire stations in the area-of-interest, a number of hospitals in the area-of-interest, a distance to the area-of-interest from the number of fire stations and the number of hospitals and a number of sprinkler systems in the area-of-interest.

The potential impact level factors for the area-of-interest may include a number of police stations in the area-of-interest and a distance to the area-of-interest from the number of police stations and a number of monitoring systems.

The potential impact level factors may include one or more of an expected density of people in the area-of-interest, a current protection status in the area-of-interest and a number of significant structures in the area-of-interest.

In an additional embodiment, the present invention provides a non-transitory computer-readable medium, the computer-readable medium having computer-readable instructions stored thereon that, when executed by a computing device processor, cause the computing device to determine a base risk score for an area-of-interest, to derive a graphical representation of the area-of-interest and one or more defense strategies for the area-of-interest and to train an adversarial reinforcement learning agent to identify one or more successful attack paths on the graphical representation of the area-of-interest that are effective in bypassing the one or more defense strategies for the area-of-interest. The instruction further cause the computing device to determine an active risk score for a real-time situation in the area-of-interest based upon the one or more successful attack paths identified by the adversarial reinforcement learning agent and to determine one or more mitigation actions that will reduce the active risk score for the area-of-interest based upon the base risk score and one or more predetermined resource constraint, wherein reducing the active risk score reduces a threat footprint for the area-of-interest.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 6 illustrates an exemplary adversarial learning algorithm, in accordance with an embodiment of the present invention.

FIG. 11A provides insights derived for the graphical illustration of FIG. 10A for various starting nodes and employing 3 guards for mitigation, in accordance with an embodiment of the present invention.

FIG. 11B provides insights derived for the graphical illustration of FIG. 10A for various starting nodes and employing 6 guards for mitigation, in accordance with an embodiment of the present invention.

FIG. 11C provides insights derived for the graphical illustration of FIG. 10A for various starting nodes and employing 12 guards for mitigation, in accordance with an embodiment of the present invention.

FIG. 17 provides insights derived for the graphical illustration of FIG. 16A, FIG. 16B and FIG. 16C for various starting nodes and employing 3 guards for mitigation, in accordance with an embodiment of the present invention.

DETAILED DESCRIPTION OF THE INVENTION

Figure 1A:
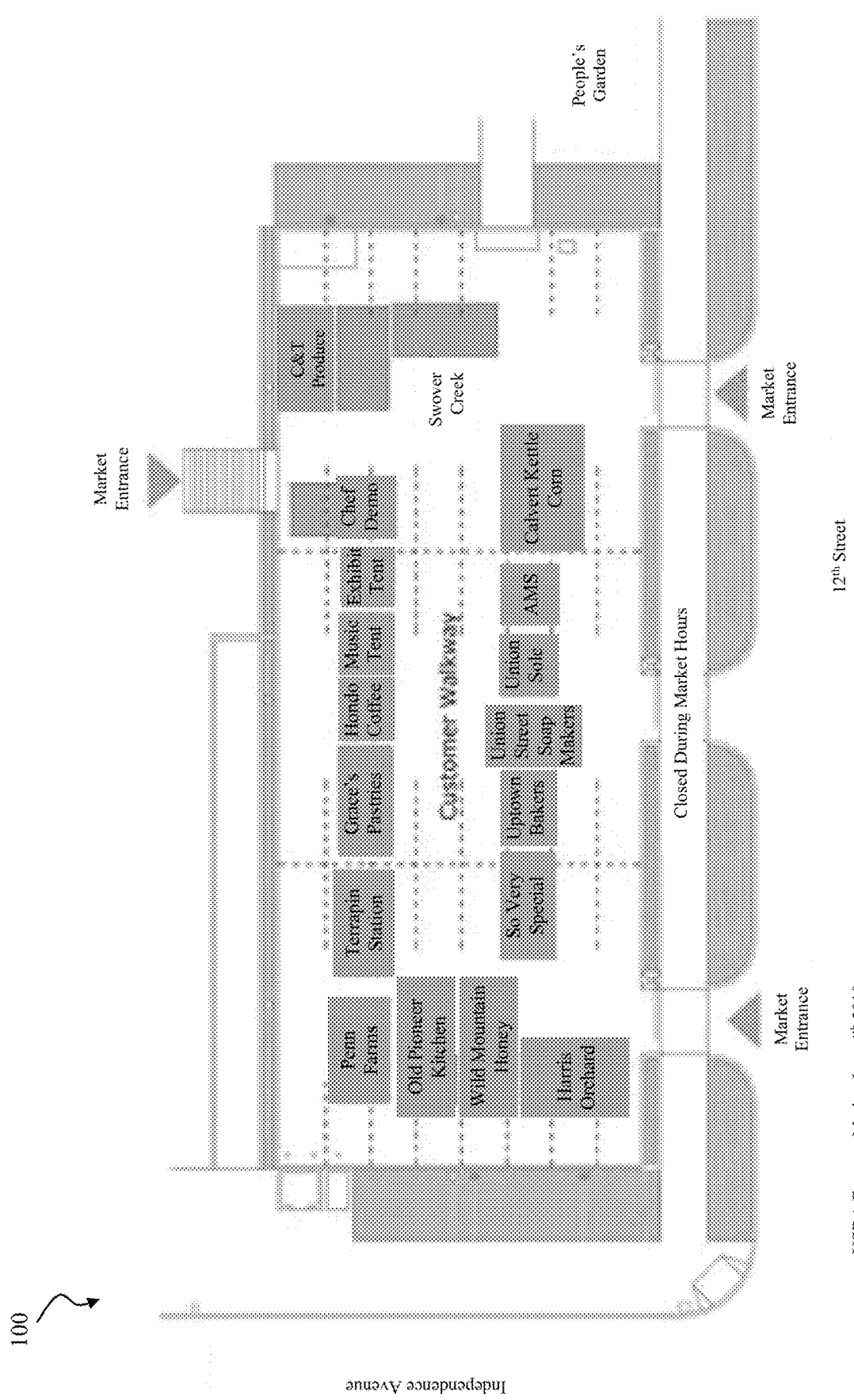
FIG. 1A illustrates an exemplary area-of-interest (Farmer's Market), in accordance with an embodiment of the present invention.

Reference will now be made in detail to various examples, examples of which are illustrated in the accompanying drawings. While various examples are discussed herein, it will be understood that they are not intended to be limiting. On the contrary, the presented examples are intended to cover alternatives, modifications, and equivalents, which may be included within the spirit and scope of the various examples as defined by the appended claims. Furthermore, in this Detailed Description of the Invention, numerous specific details are set forth in order to provide a thorough understanding. However, examples may be practiced without one or more of these specific details. In other instances, well known methods, procedures, components, and circuits have not been described in detail as not to unnecessarily obscure aspects of the described examples.

It will be understood that, although the terms first, second, third, without limitation, may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In various examples, the present invention provides an artificial intelligence (AI) framework to assist security advisors and venue owners in the process of securing soft targets and crowded places (STCP).

In accordance with the present invention, for a given area-of-interest, a base risk score is determined. The base risk score includes both internal and external attributes of the area-of-interest. The area-of-interest is then graphically represented using a plurality of vertices, representing physical locations, and a plurality of edges, representing interconnections between the physical locations. The graphical representation considers the rule-based defense strategies currently in place, such as guarding and/or monitoring strategies, to simulate various adversarial scenarios in the area-of-interest. An adversarial reinforcement learning agent is then trained to identify various attack paths on the graphical representation of the area-of-interest that are successful in bypassing the defense strategies that are currently in place to reach to a high-value vertex. An active risk score, pertaining to the successful attack learned by the adversarial reinforcement learning agent, is then calculated. Given a set of known resource constraints and the base risk score previous determined, the method provides a recommendation for the best mitigation actions that can be implemented to reduce the active risk score, and thereby reduce the thread footprint of the area-of-interest.

The data model of the area-of-interest can represent both indoor and outdoor spaces, wherein the basic data object is referred to as the area-of-interest (AoI). The area-of-interest may be centered on a building and its surroundings or on an open space, such as a park, roadway, or open field. In all cases the area-of-interests includes not only the event venue itself, but also its surroundings. Information about the surroundings of the area-of interest include factors such as the locations of nearby police, fire, and emergency services.

Figure 1B:
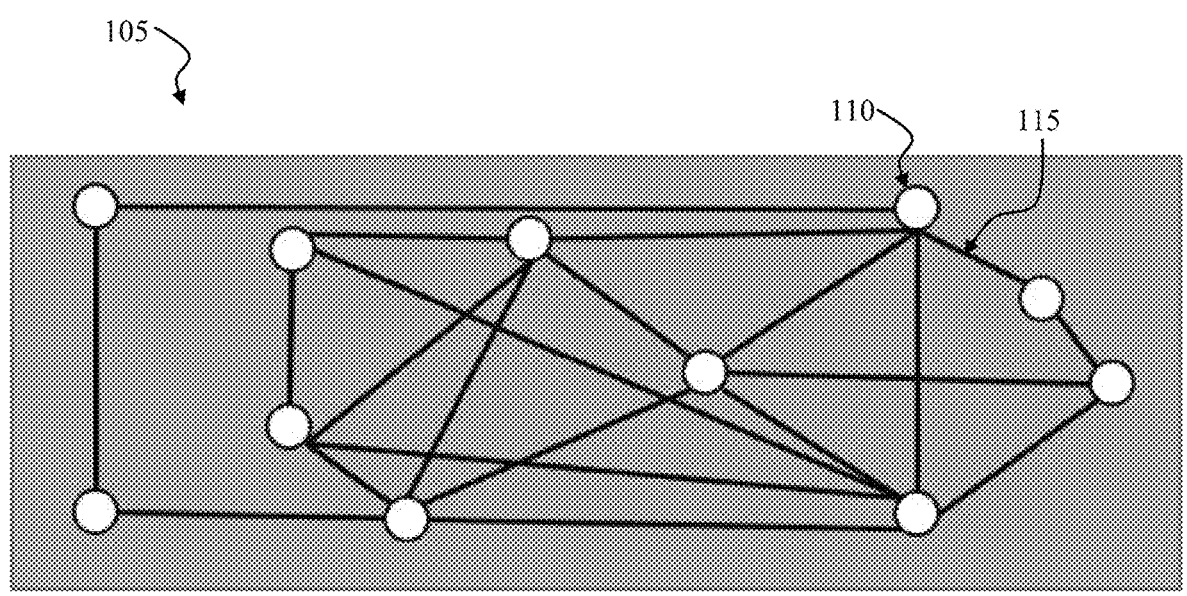
FIG. 1B illustrates a graphical representation of the area of interest of the Farmer's Market illustrated in FIG. 1A, in accordance with an embodiment of the present invention.

FIG. 1A and FIG. 1B illustrate a simplified example of a graph model 105 of a farmer's market 100, with nodes 110 representing entrances, exits and other points of interest inside and around the market space and edges 115 representing streets and walkways. As shown in FIG. 1B, the area-of interest shown in FIG. 1A 100 is represented as an arrangement of nodes 110 (or vertices) and edges 115, in the language of mathematical graph theory. Nodes 110 represent strategic physical locations within or around the venue, for example entry/exit points, central electric wiring location, central plumbing location, etc. Nodes 110 can also be used to represent resources such as guards, barriers, and surveillance cameras. Edges 115 represent the physical connections among the nodes. Such a representation is derived from the actual area-of-interest 100.

For nodes 110 that represent resources such as guards and surveillance cameras, graph connections and properties can change over time (e.g., a guard may move from one entrance to another, and a door may change from "locked" to "unlocked"). The graph representation is highly extensible, meaning it can represent any area-of-interest, either interior, exterior, or both.

In the proof of concept, different area-of-interest models were created for several example indoor and outdoor locations at different scales. Experiments were conducted by collecting a large quantity of information from areas-of-interest in the Boston/Cambridge area and that information was used to generate respective base risk scores, as explained in more detail below. Graph models were then created of certain locations such as a sports stadium and a farmer's market. Different defense strategies were then simulated for these venues, which include simulating patterns of the movement of guards and the allocation of protective measures, such as surveillance cameras. The invention utilizes the location-based graph models and the defense strategies in place at the venue, in combination, to discover and quantify risk of attack as described in more detail below.

A base risk score for the area-of-interest is first determined. The base risk score considers both external attributes and internal attributes of the area-of-interest. External attributes may include police and fire stations, hospitals, and different modes of transit. Internal attributes may include entry/exit points, sprinkler system and alarms. These external and internal attributes are exemplary in nature and are not intended to be limiting. Various other attributes are within the scope of the present invention.

In a particular embodiment, four categories of factors were considered in the determination of the base risk score for an area-of-interest: (1) Criticality level: number of transit stations in the vicinity, number of entry/exit points, and crime rate; (2) Recovery level: number of and distance to the area-of-interest of fire stations and hospitals in the vicinity, and availability of sprinkler system; (3) Protection level: number of and distance to the area-of-interest of police stations, and availability of monitoring system; and (4) Potential impact level: density (expected number of people) around the area-of-interest, and number of significant structures in the vicinity.

Figure 2:
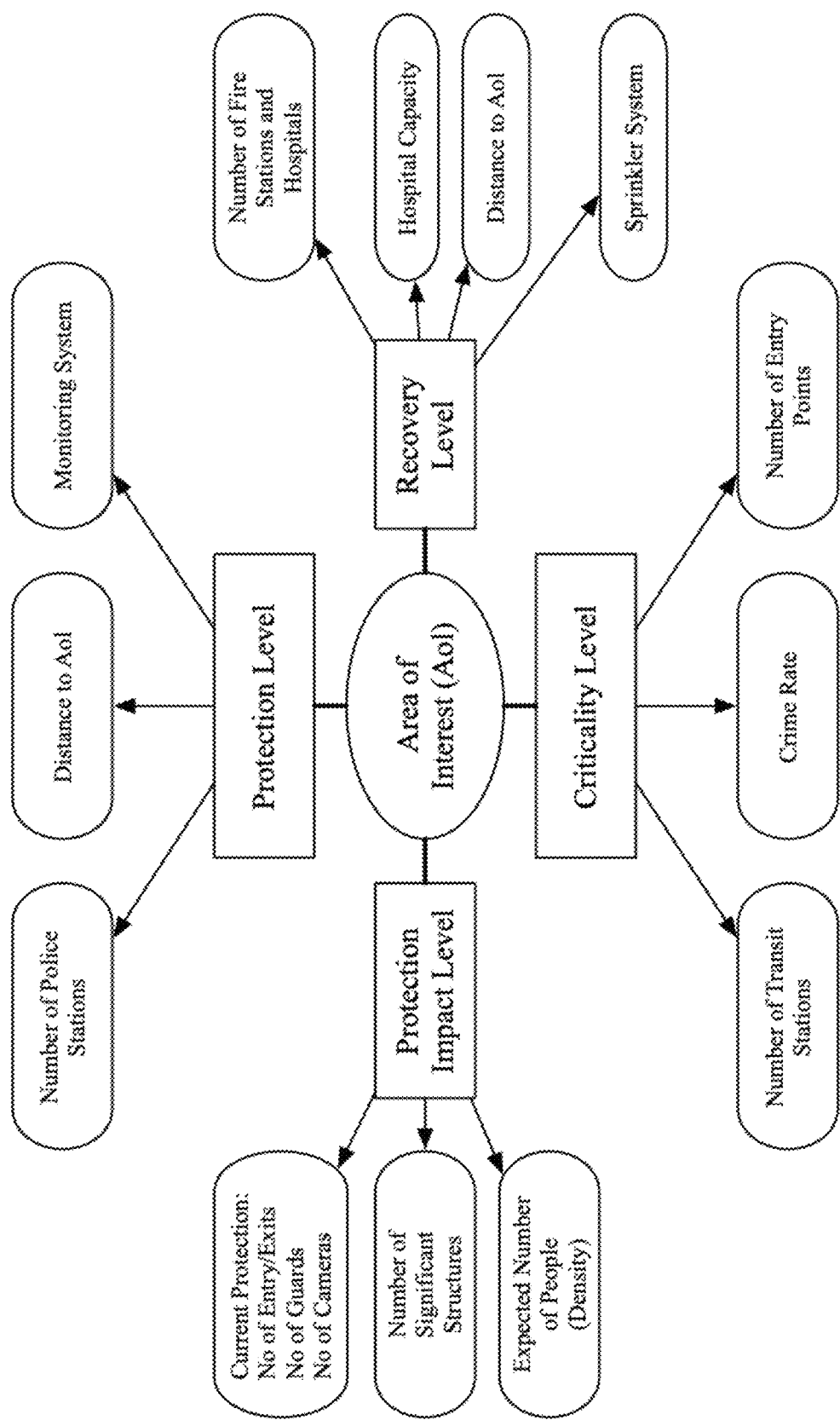
FIG. 2 illustrates various factors for determining a base risk score for an area-of-interest, in accordance with an embodiment of the present invention.
Figure 3:
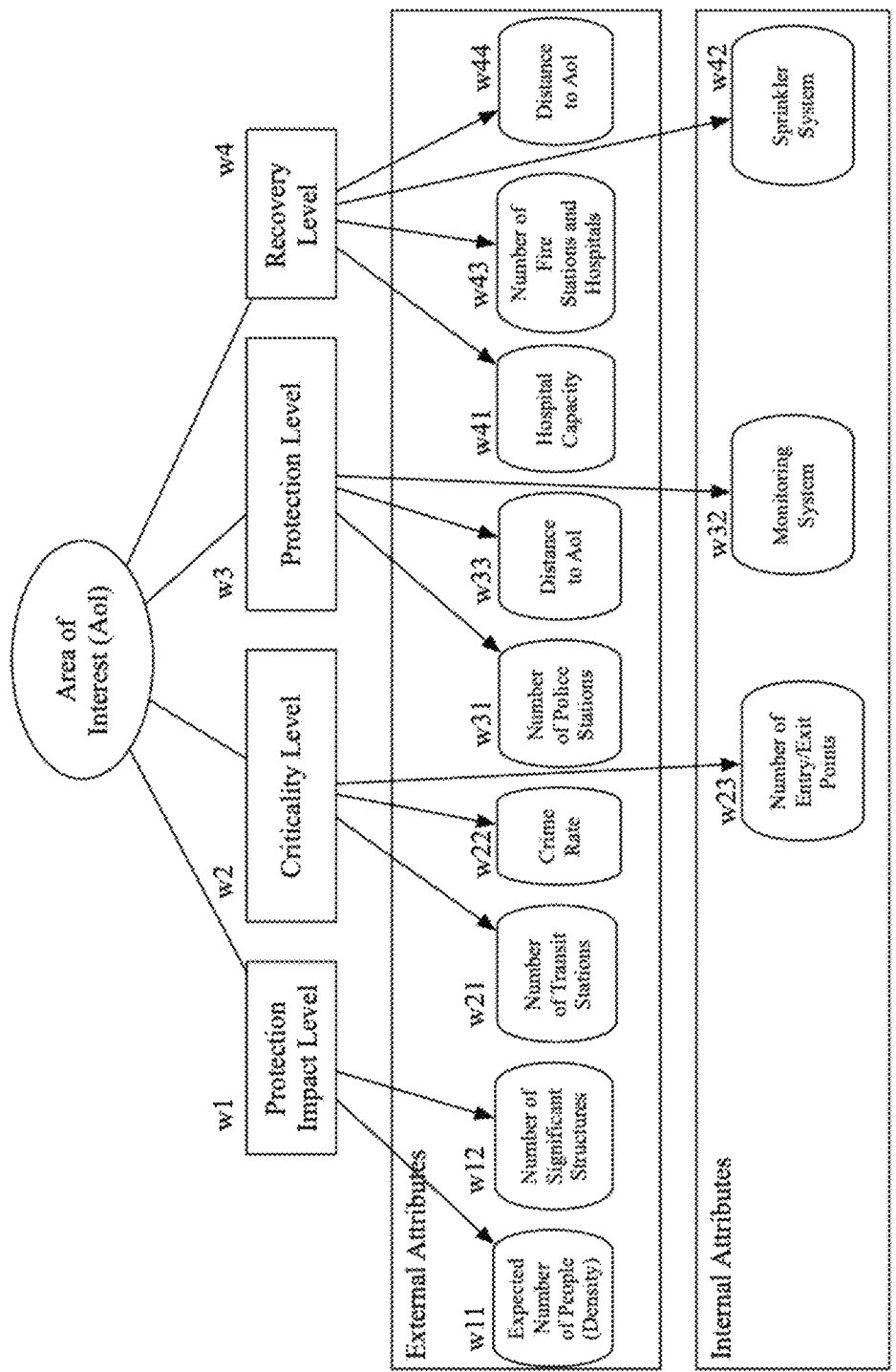
FIG. 3 illustrates a process for weighting the base risk score of the area-of-interest utilizing a Quantitative Value Function (QVF), in accordance with an embodiment of the present invention.

Some of these factors take continuous numerical values, while others are categorical. These features and factors are then arranged using a quantitative value function (QVF) hierarchy process. A risk score, normalized to the range 0 (no risk) to 1 (extreme risk), is calculated by assigning numeric weights to each factor as shown in FIG. 2 and FIG. 3. For initial testing, the weights were first assigned uniformly (i.e., all factors were given equal weight). The weights for the factors were then fine-tuned by giving more importance to the potential impact level factor and relatively reducing the weight associated with the criticality level factor. This method is generalizable, and the weights could be selected arbitrarily by the security advisors. Finally, a composite base risk score was calculated by considering all the factors and sub-factors along with their respective weights.

In a specific embodiment, the determination of the base risk score for an area-of-interest includes:

Select a vicinity radius of an area-of interest

For potential impact level factor: assign 1 if density is more than 200/km$^2$, assign 0.75 if population density is more than 150/km$^2$, 0.5 if density is more than 100/km$^2$, 0.25 if density is more than 50/km$^2$ For potential impact level factor: assign 1 if significant structures are present in the vicinity of the area-of-interest; 0 if no significant structures are present For criticality level factor: normalize the distances of the transit stations from the area-of interest (min of 0 and max of vicinity radius)

For criticality level factor: find crime rate and normalize the value (min 0 and max 100)

For criticality level factor: find number of entry exit points, if there exist one entry exit point assign 0.25, if there is 2 entry exit points assign 0.5, if there exists 3 entry exit points assign 0.75 for 4 or higher number of entry exit points assign 1

For Recovery Level: normalize the distances of hospitals from the area-of interest in the vicinity radius (min of 0 and max of vicinity radius)

For Recovery Level: normalize the distances of fire stations from the area-of interest in the vicinity radius (min of 0 and max of vicinity radius)

For Recovery Level: assign 0 if there exist a smoke detection and sprinkler system, assign 1 otherwise For Protection Level: normalize the distances of police stations from the area-of interest in the vicinity radius (min of 0 and max of vicinity radius)

Figure 4:
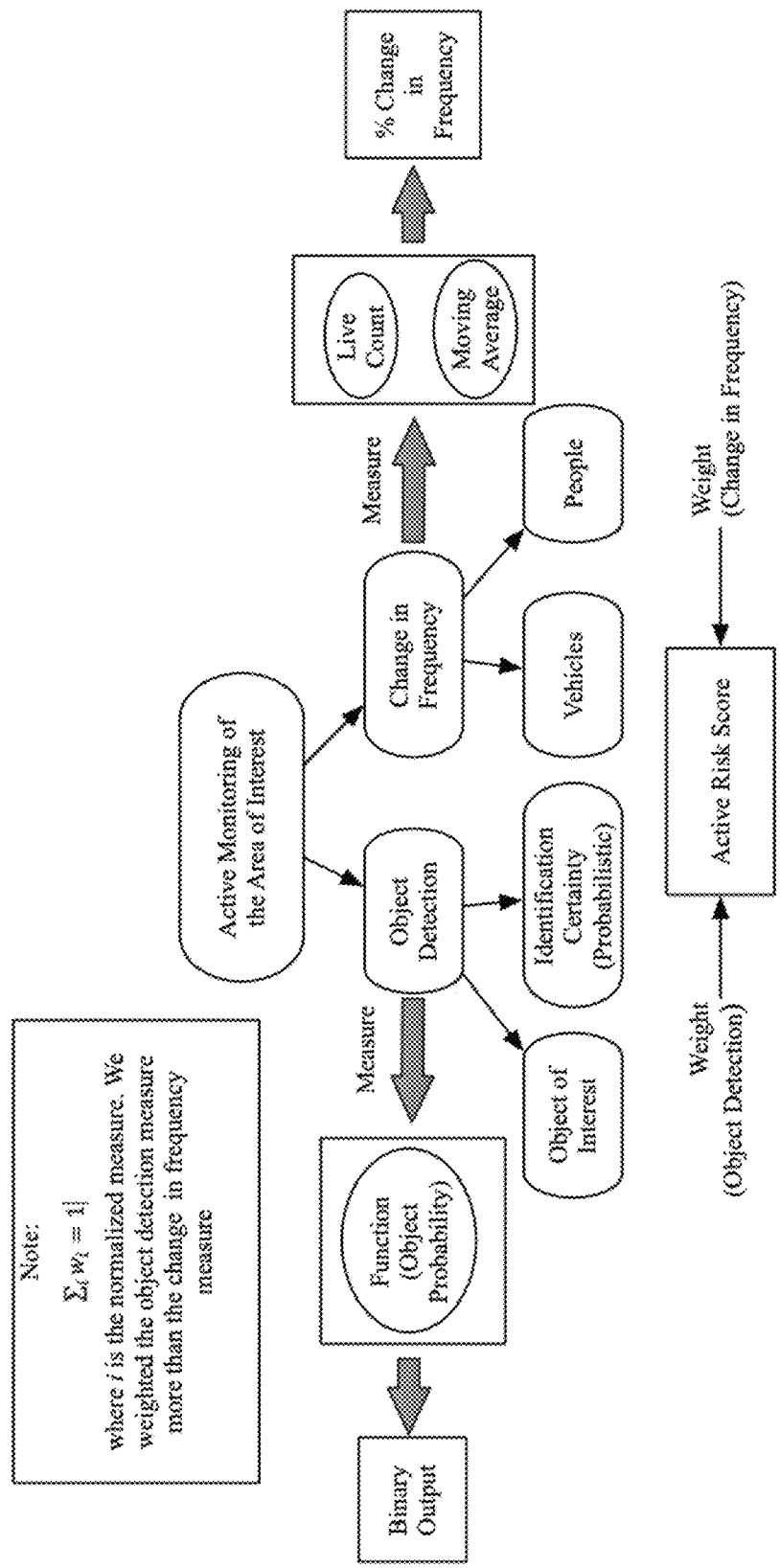
FIG. 4 illustrates a method for determining an active risk score of the area-of-interest, in accordance with an embodiment of the present invention.

For Recovery Level: assign 0 if there exist a surveillance system, assign 1 otherwise Following the determination of the base risk score for the area-of-interest, an active risk score is calculated in real time considering either the current activities in the region surrounding the designated venue, using data collected from observation cameras, or simulated activities from a user-defined scenario. The active risk score can be used as part of an active defense strategy during an event, and it can also be used with pre-recorded historical data or synthesized data to perform predictive "What-If" analysis during the planning phase. This capability enables the venue owners or security advisors to identify potential active risks and recommended mitigations in advance of an actual event (i.e., at the planning phase). The capability can be implemented in several ways: one can manually enter values such as the anticipated volume of traffic for the event, or from pre-recorded data such as video from a prior similar event. For the purpose of conducting feasibility studies and developing a prototype, the adversarial environment as simulated. Based on the chosen inputs (by an advisor during the planning phase), the simulator generates various adversarial scenarios and calculates the respective active risk scores. FIG. 4 illustrates the factors and methods for determining the active risk score.

Figure 5:
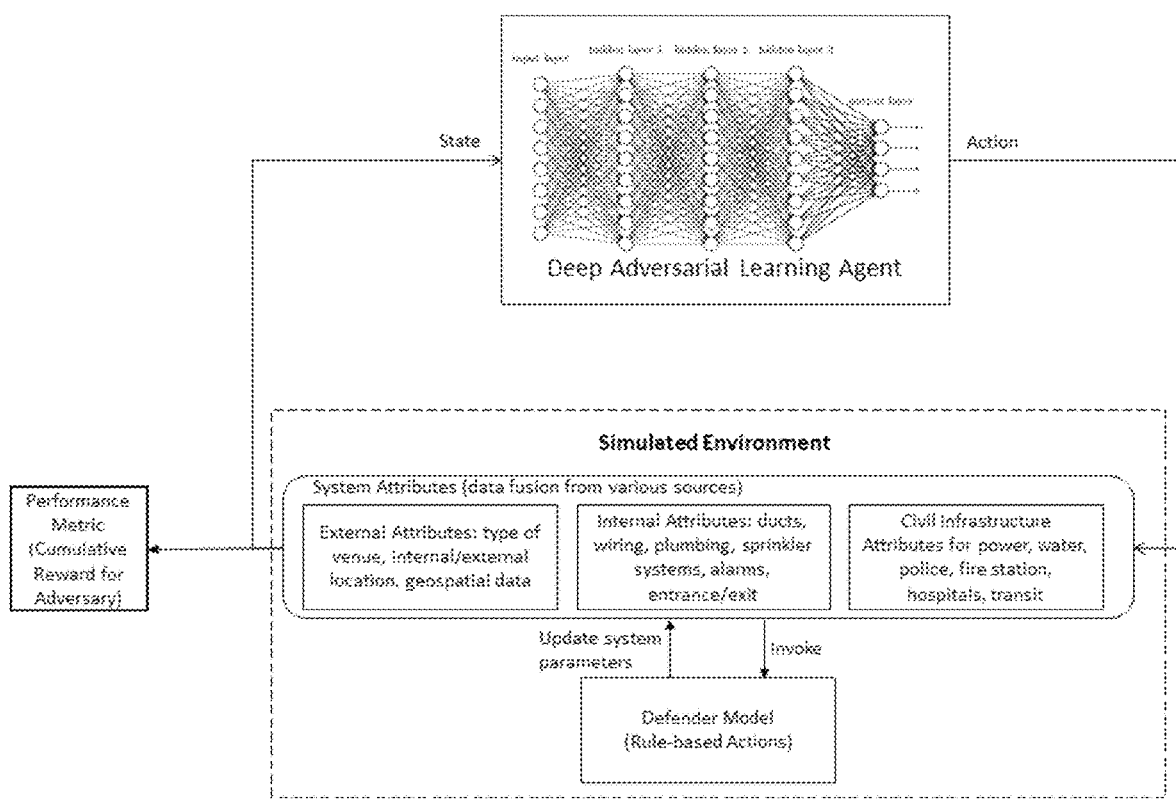
FIG. 5 illustrates an adversarial learning framework for training an adversarial reinforcement learning agent, in accordance with an embodiment of the present invention.

The problem of vulnerability identification in an area-of-interest is modeled as an adversarial learning problem and an Artificial Intelligence (AI) agent is trained using a deep reinforcement learning framework to identify and exploit the security gaps in a defender's environment (the area-of-interest) and security policies. The actions of adversaries (i.e., attacks on assets in the area-of-interest) are identified by modeling them as movements of entities from node-to-node in the area-of-interest graph. In this framework, the graph model of the area-of-interest is ingested, and a simulated environment is created. For instance, the graph representation of the farmer's market or sports stadium is taken, which contains the external and internal attribute information, and an environment is simulated by taking into account a rule-based model for the defender's security strategies on the graph-based representation of the area-of-interest. FIG. 5 illustrates a schematic of the adversarial learning framework.

The adversarial agent (an AI agent) is then trained by allowing it to interact with the simulated environment, with an objective of learning policies (sequence of actions) that produce maximum gain for the adversary over a finite time-period. The adversarial agent takes an action that impacts the defender's environment. The impact then invokes a rule-based defender action model that takes an internal action, which updates the system parameters of this environment. The adversary, who has full visibility of the environment, gets a reward or penalty for its action and then it follows by taking another action. This sequential decision-making approach to finding an attack path of capturing the high-value node(s), i.e., vulnerabilities in the system, to achieve maximum gain under uncertain conditions (changes in system parameters by the rule-based defender model) is formulated as a Markov decision process (MDP).

The adversarial learning agent continuously interacts with this environment to identify the vulnerable nodes and the optimal times to exploit them. i.e., an adversary identifies the strategic locations in the area-of-interest that are either completely unguarded or can be exploited at certain times. The adversarial agent achieves this objective by learning a sequence of actions (an adversarial policy). The adversarial learning framework consists of external attributes, such as types of venue, internal/external location details, geospatial data and internal attributes, such as information on ducts, wiring, plumbing, sprinkler systems, alarms and entry/exit points.

The adversarial agent takes actions in order to achieve the maximum expected cumulative reward, $R_t = \Sigma_t (\gamma^{t-t_0}) r_t$, that includes both the immediate reward and the accumulated rewards to be obtained in the future by taking the action. With such large state and action spaces, a deep neural network-based approximator is used to learn the long-term values of taking an action given a state (observation), denoted by $Q(s_t, a_t) = \max_\pi [R_t | a_t, s_t, \pi]$. Here, $s_t$ represents the state and $a_t$ represents the action taken at time t following the policy $\pi$. The Q value approximator is denoted by $Q(s_t, a_t | \theta_t)$, where $\theta$ represents the neural network parameters. The approximator is trained using a loss function, $L(\theta_t) = E_{s_t}[\hat{Q}(s_t, a_t | \theta_t) - Q(s_t, a_t | \theta_t))^2]$, where $\hat{Q}(s_t, a_t | \theta_t) = r_t + \gamma \max_{a_{t+1}} Q(s_{t+1}, a_{t+1} | \theta_t)$. The system attribute information (represented as nodes in a graph) is provided to the adversarial learning agent as a part of its state space. This state is then passed on to the deep neural network approximator to obtain the estimates of the Q value for each possible action. The action pertaining to the highest Q value is then selected as the output. The adversarial learning mechanism output is the adversarial policy that shows the exploited node(s) and the attack path taken by the adversary.

The adversarial agent gets an immediate reward of 1, if the agent remains undetected and occupies any node that is not high-value; +100, if the agent remains undetected and occupies a high-value node; and −100, if the agent is detected by the defender.

An exemplary adversarial learning algorithm is illustrated in FIG. 6.

Figure 7:
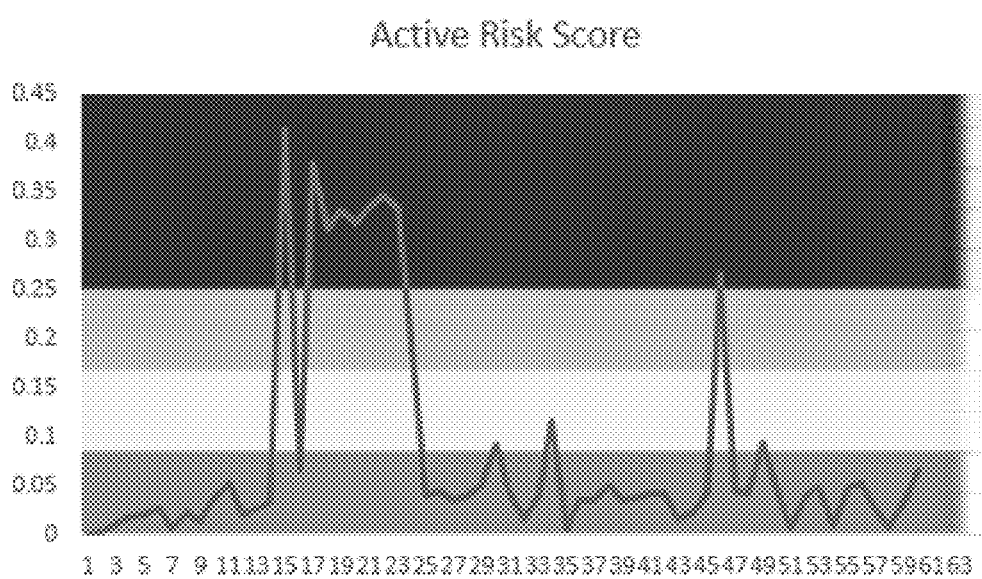
FIG. 7 illustrates an example of an active risk score display during a simulated event for the area-of-interest, in accordance with an embodiment of the present invention.

The simulation will play out different possibilities and show the best-case, worst-case, and average-case scenario for the defender. For example, FIG. 7 shows the active risk score of an area-of-interest after simulating the environment with an adversary. The x-axis shows the time, and the y-axis shows the normalized risk score.

Figure 8:
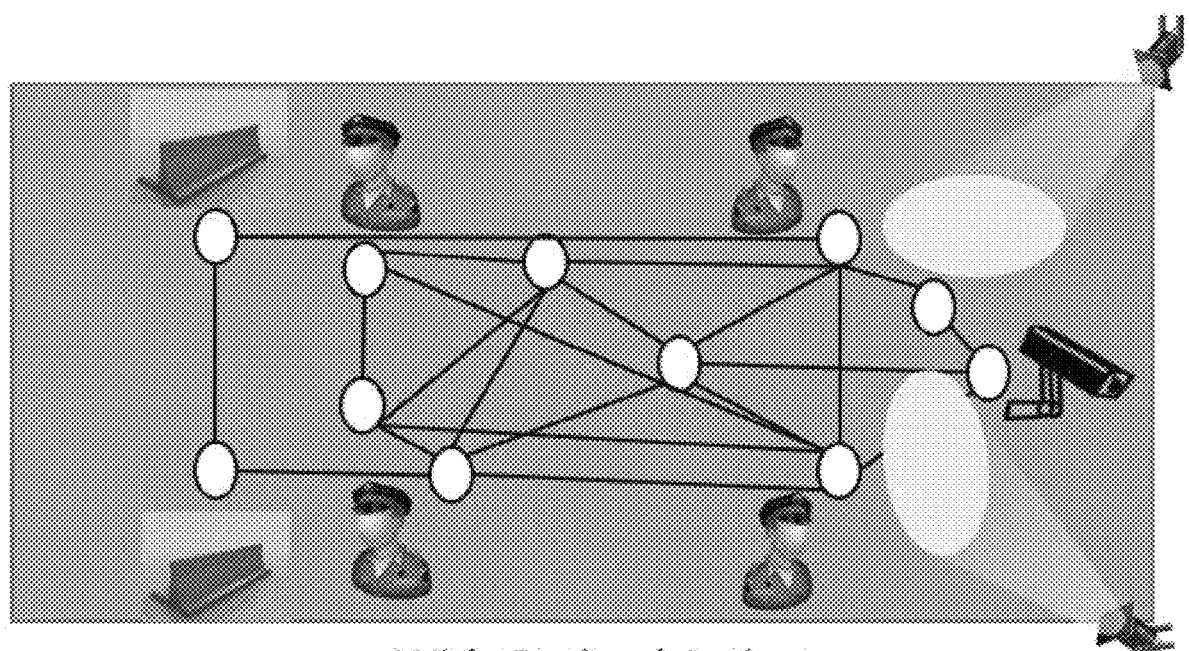
FIG. 8 illustrates an example of remedial actions to mitigate vulnerabilities for the area-of-interest, in accordance with an embodiment of the present invention.
Figure 9:
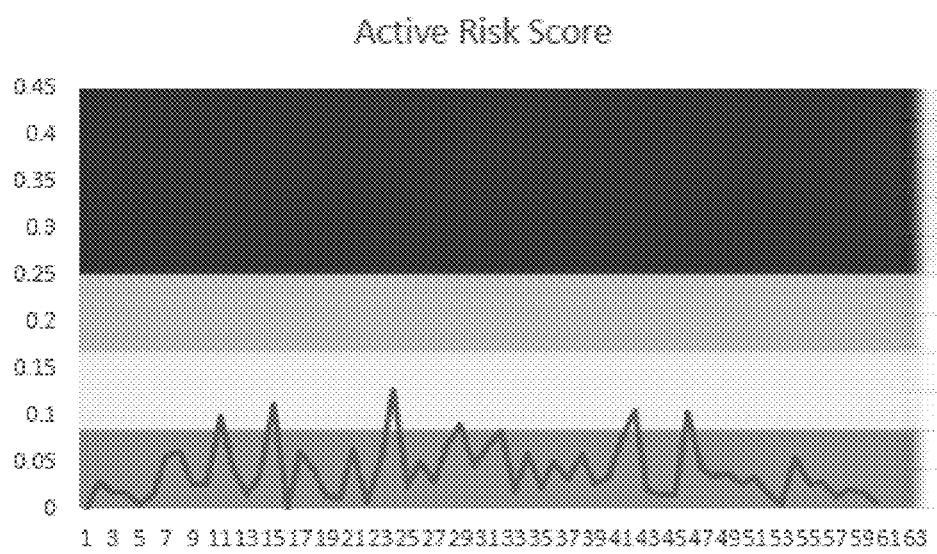
FIG. 9 illustrates an example of an active risk score display during a simulated event for the area-of-interest with remediations implemented, in accordance with an embodiment of the present invention.

Through the adversarial model, the defender learns about the vulnerable nodes and the attack path taken by an adversary. Based on the budget constraints and the base risk score of the area-of-interest, the inventive framework recommends remediations. For instance, if the base risk score of an area-of-interest is high, then a more comprehensive remediation action plan is presented that maximizes the budget, while minimizing the active risk score. FIG. 8 shows the recommended resources (remedial actions) that will reduce the risk score superimposed on the graph model from FIG. 1B. FIG. 9 shows an example of the updated active risk score which could be obtained by playing out the same adversarial scenario with the recommended actions.

As such, in various embodiments, the invention identifies the vulnerabilities in an area-of-interest and enables a decision-maker (venue owner or security advisor) to make changes to the physical infrastructure model (e.g., adding a jersey barrier), the policy rules that determine actions taken in response to certain events, or both. The decision-maker can then re-run the adversarial learning mechanism against the new environment model (with remediations) to assess the effect of the changes. The ability to test and evaluate proposed changes using the invention is a powerful new tool for the venue owners and security advisors.

Two sets of experiments were conducted to check the robustness of, and to compare the performance of, the proposed framework in different kinds of networks with different intensity of security personnel guarding.

Figure 10A:
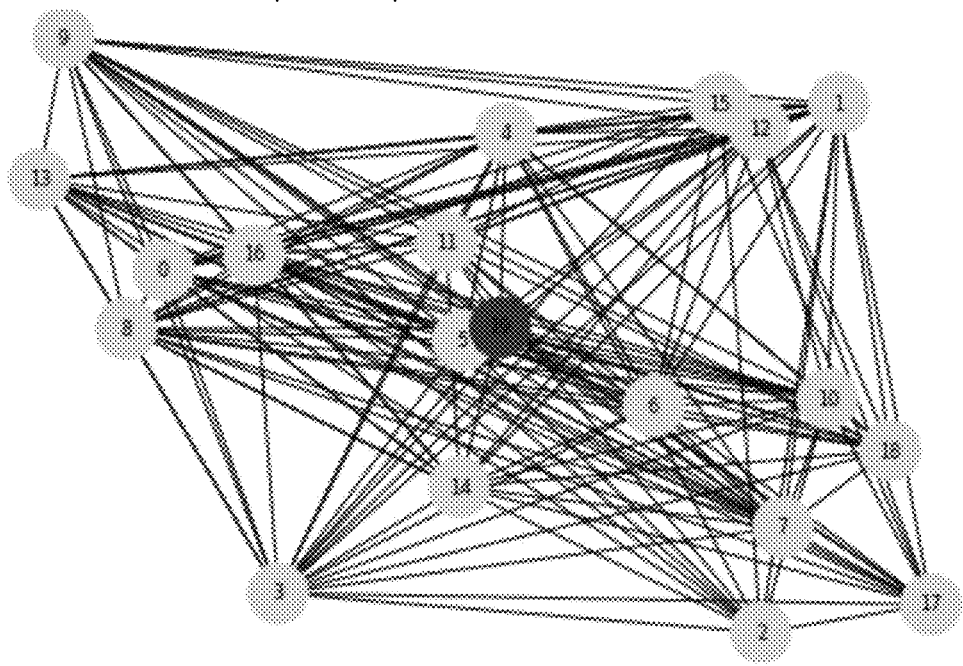
FIG. 10A illustrates a graphical representation of an area-of-interest having 20 nodes and 0.8 connectivity, in accordance with an embodiment of the present invention.
Figure 10B:
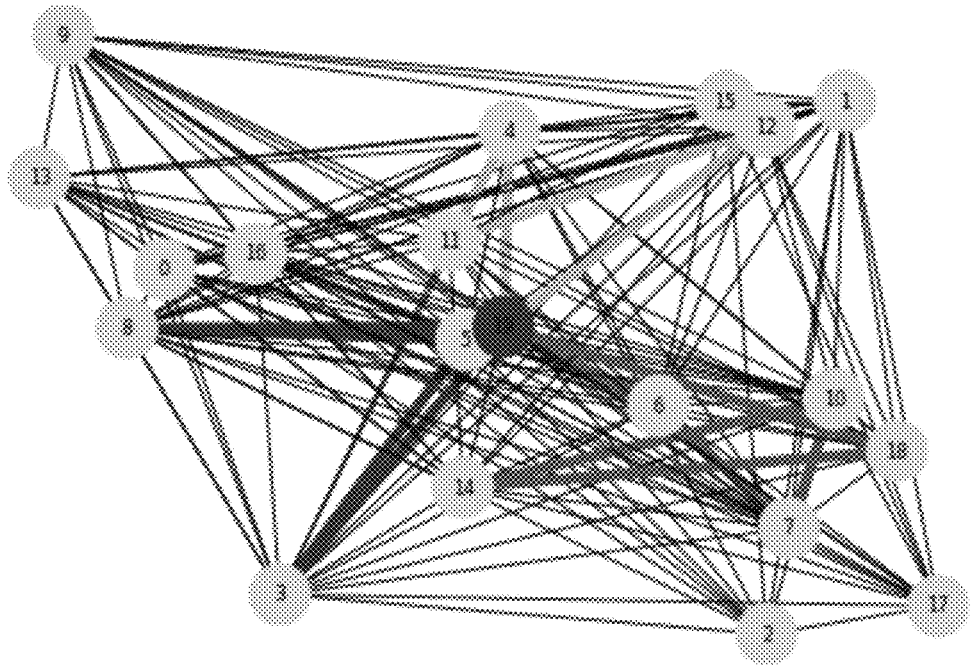
FIG. 10B illustrates a graphical representation of the area-of-interest of FIG. 10A and employing 3 guards for mitigation, in accordance with an embodiment of the present invention.

Experiments were conducted with various number of guards, network size and connectivity. In a first experiment, the number of security personnel (guards) was varied for a 20 node, densely (0.8) connected network. The proposed framework was employed with 3, 6, 12 number of guards. FIG. 10A illustrates a graphical representation of the area-of-interest having 20 nodes and 0.8 connectivity. FIG. 10B illustrates a graphical representation of the same area of interest with 3 guards.

FIG. 11A and FIG. 11B provide an analysis of the exploitability of the graph based on different possible starting nodes with 3 and 6 guards guarding the camera surveillance enabled area-of-interest, respectively. FIG. 11C provides an analysis of the exploitability of the graph based on different possible starting nodes with 12 guards guarding the camera surveillance enabled area-of-interest.

Figure 12A:
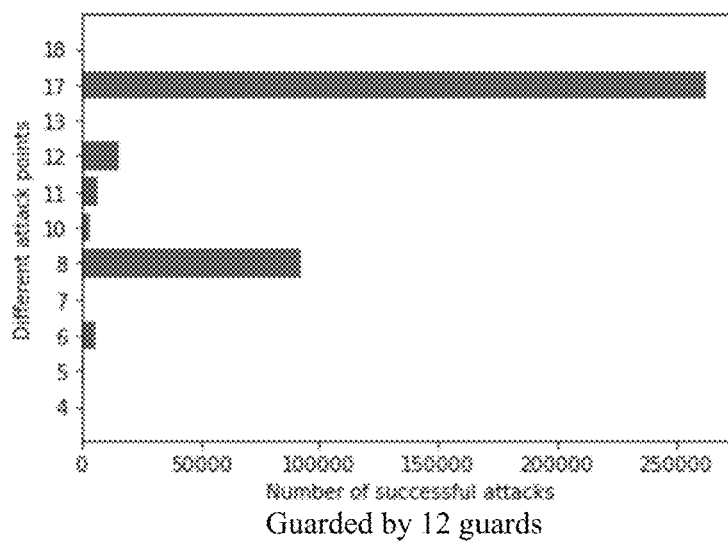
FIG. 12A is a graphical illustration of the number of successful attacks for various attack points derived from the experiment shown in FIG. 10A and employing 12 guards for mitigation, in accordance with an embodiment of the present invention.
Figure 12B:
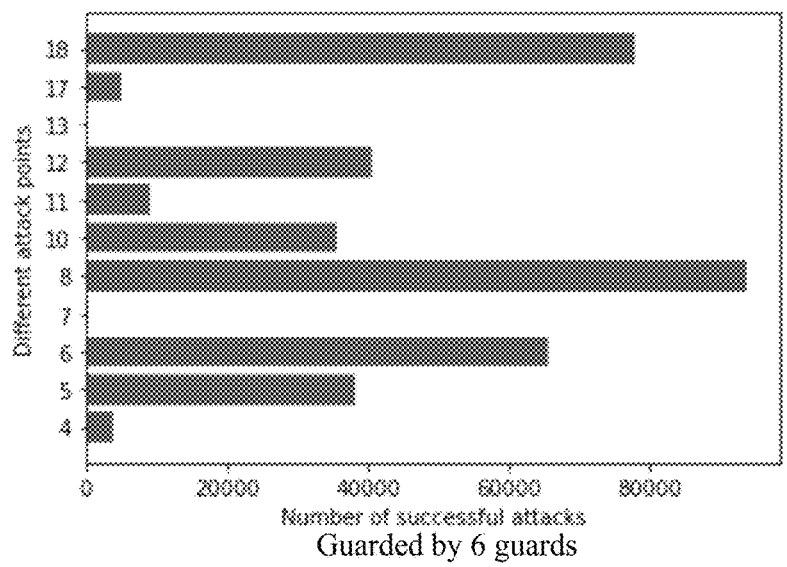
FIG. 12B is a graphical illustration of the number of successful attacks for various attack points derived from the experiment shown in FIG. 10A and employing 6 guards for mitigation, in accordance with an embodiment of the present invention.
Figure 12C:
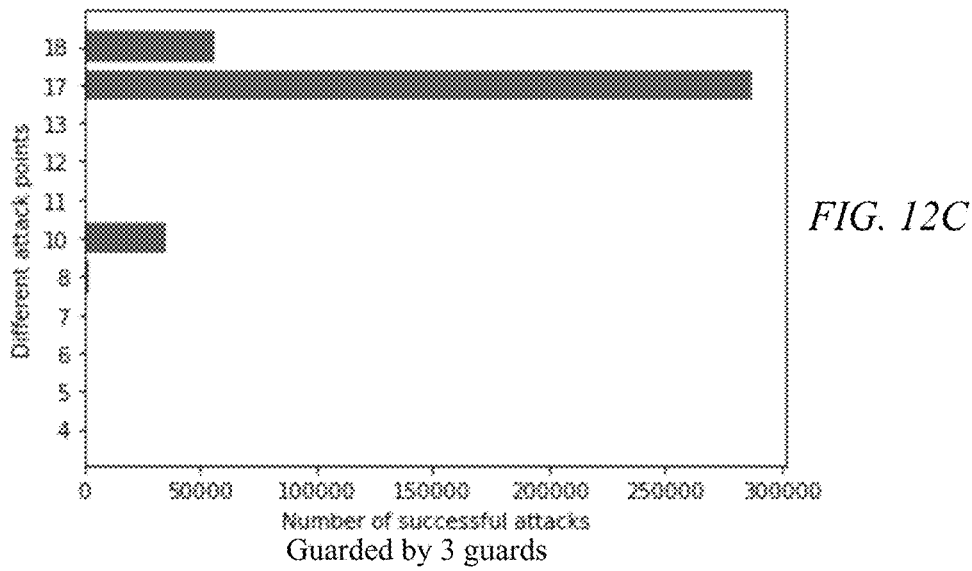
FIG. 12C is a graphical illustration of the number of successful attacks for various attack points derived from the experiment shown in FIG. 10A and employing 3 guards for mitigation, in accordance with an embodiment of the present invention.

FIG. 12A, FIG. 12B and FIG. 12C provide an analysis of the identification of the soft targets inside the guarded area-of-interest by analyzing the attack paths discovered by the agent with 12 guards, 6 guards and 3 guards, respectively.

Figure 13A:
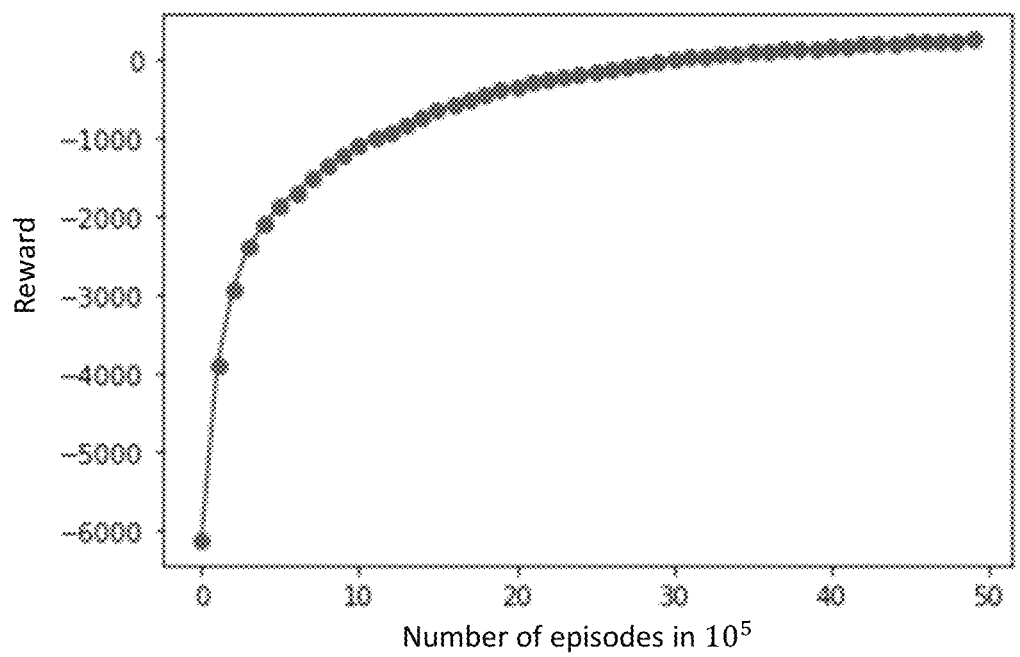
FIG. 13A is a graphical illustration of the moving average of collected rewards derived from the experiment shown in FIG. 10A and employing 3 guards for mitigation, in accordance with an embodiment of the present invention.
Figure 13B:
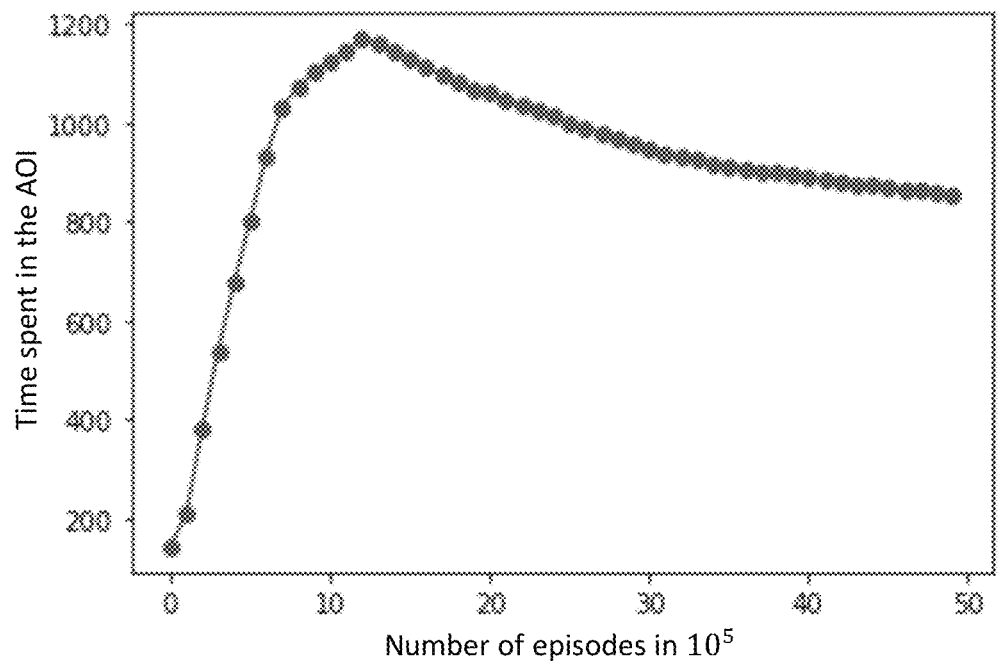
FIG. 13B is a graphical illustration of the time spent by the agent in the area-of-interest derived from the experiment shown in FIG. 10A and employing 3 guards for mitigation, in accordance with an embodiment of the present invention.
Figure 14A:
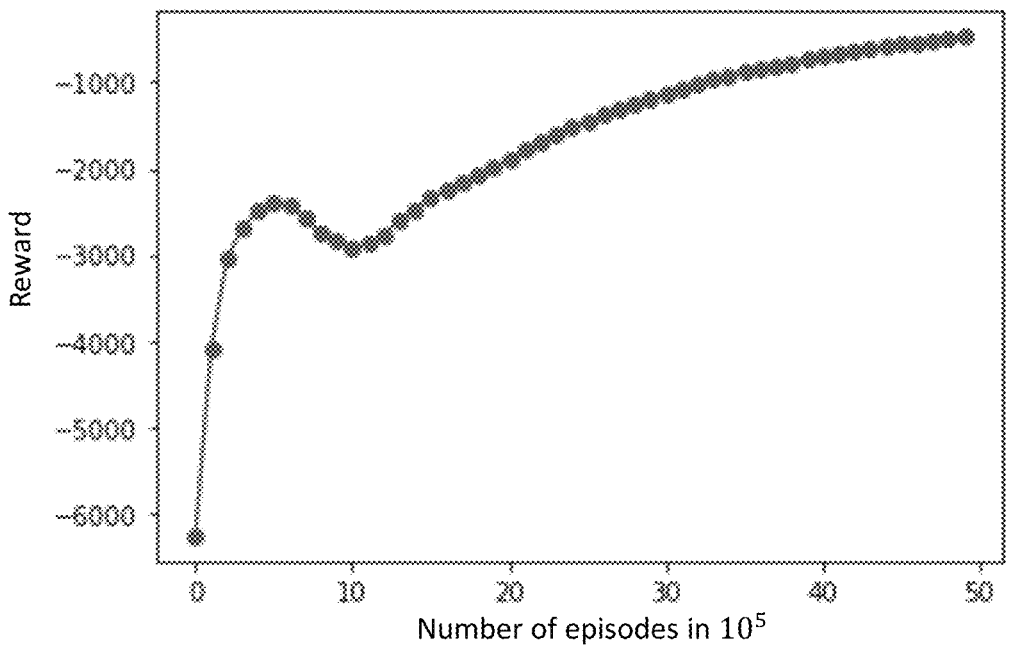
FIG. 14A is a graphical illustration of the moving average of collected rewards derived from the experiment shown in FIG. 10A and employing 6 guards for mitigation, in accordance with an embodiment of the present invention.
Figure 14B:
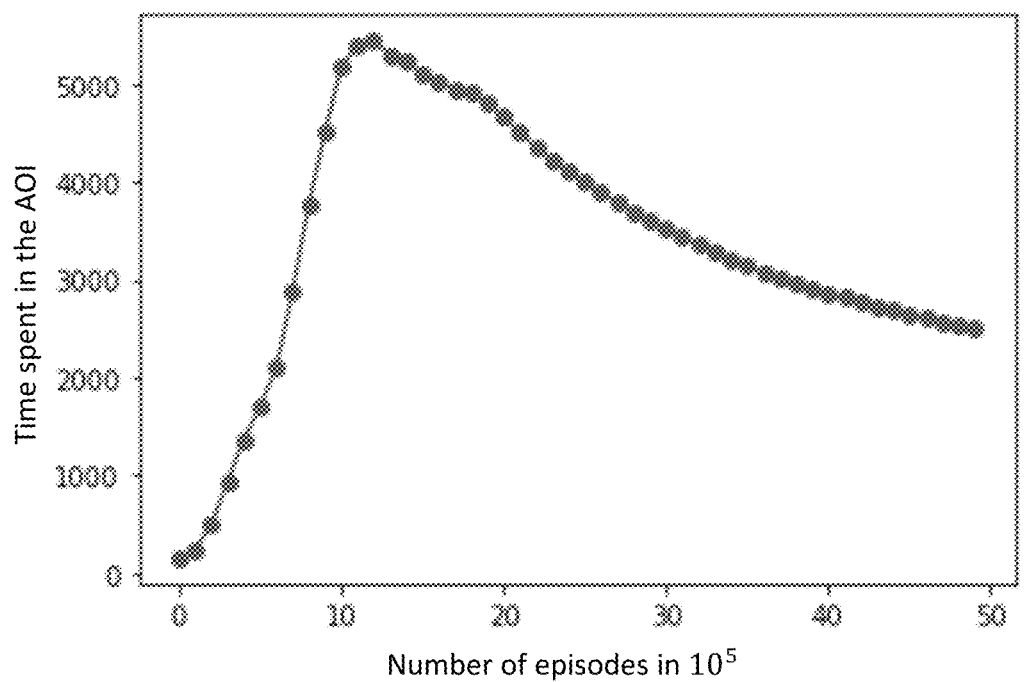
FIG. 14B is a graphical illustration of the time spent by the agent in the area-of-interest derived from the experiment shown in FIG. 10A and employing 6 guards for mitigation, in accordance with an embodiment of the present invention.
Figure 15A:
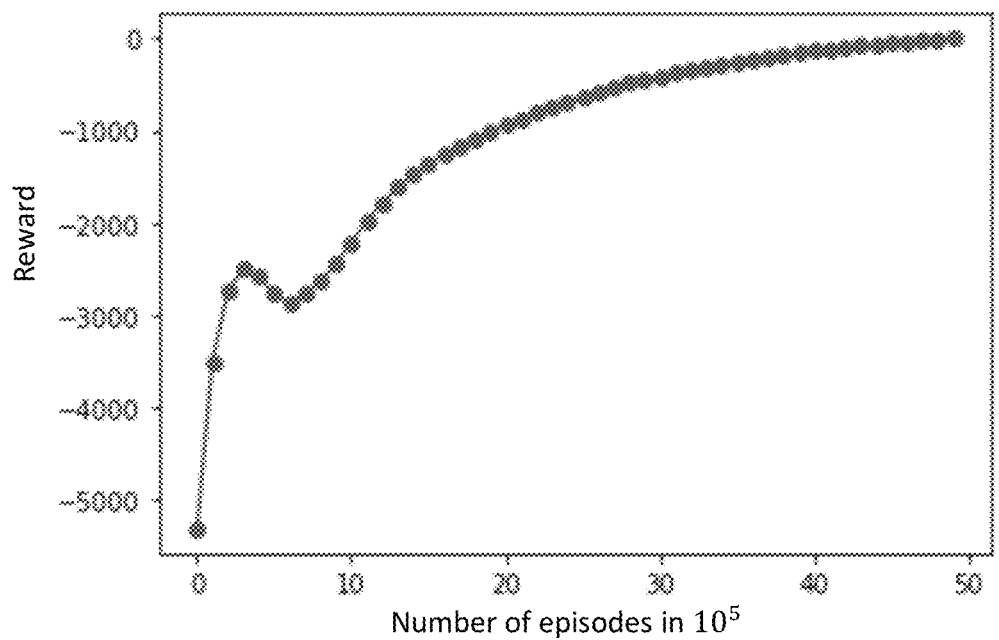
FIG. 15A is a graphical illustration of the moving average of collected rewards derived from the experiment shown in FIG. 10A and employing 12 guards for mitigation, in accordance with an embodiment of the present invention.
Figure 15B:
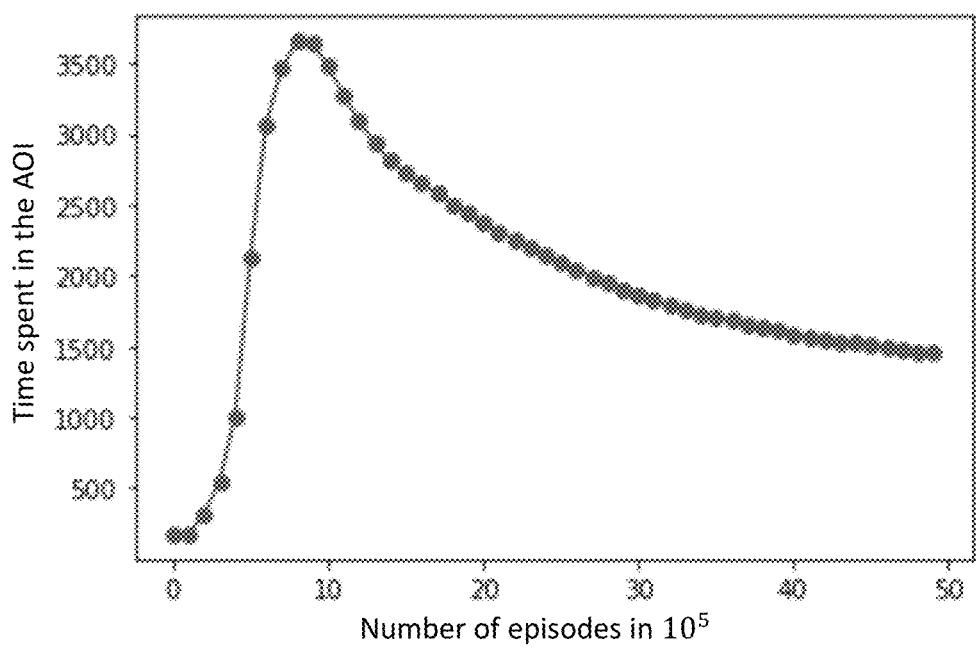
FIG. 15B is a graphical illustration of the time spent by the agent in the area-of-interest derived from the experiment shown in FIG. 10A and employing 12 guards for mitigation, in accordance with an embodiment of the present invention.

FIG. 13A provides an analysis of the moving average of the collected rewards and time spent by the agent in the area-of-interest guarded by 3 guards. FIG. 13B provides an analysis of the moving average of the collected rewards and time spent by the agent in the area-of-interest guarded by 6 guards. FIG. 13C provides an analysis of the moving average of the collected rewards and time spent by the agent in the area-of-interest guarded by 12 guards.

In a second experiment, 6 different networks were used comprising 25, 50, 100 node numbers, 0.3, 0.6 and 1 connectivity (density) and employing 3 guards.

Figure 16A:
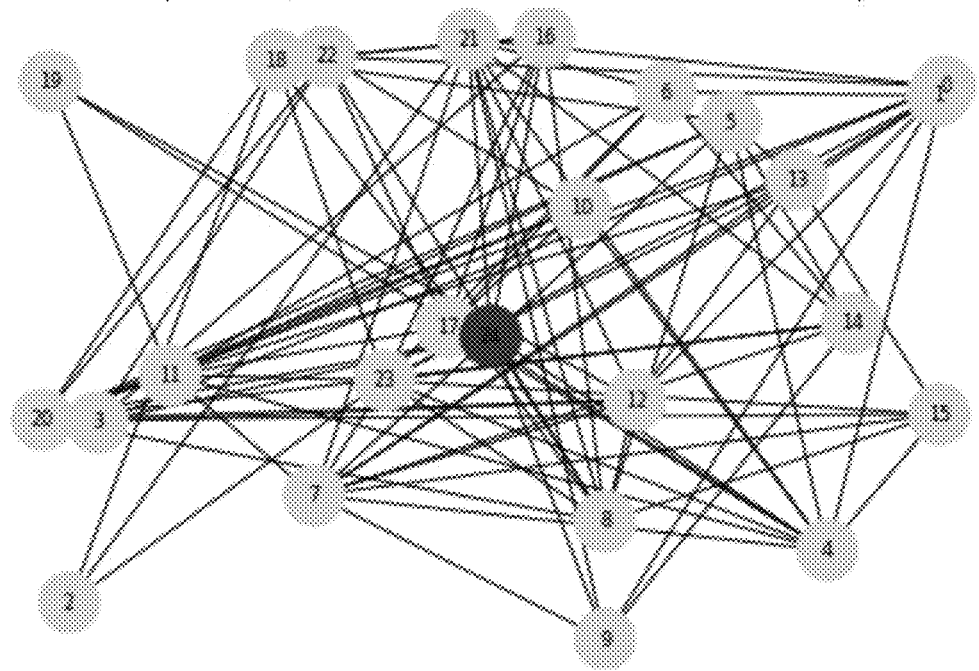
FIG. 16A illustrates a graphical representation of an area-of-interest having 25 nodes and 0.3 connectivity, in accordance with an embodiment of the present invention.
Figure 16B:
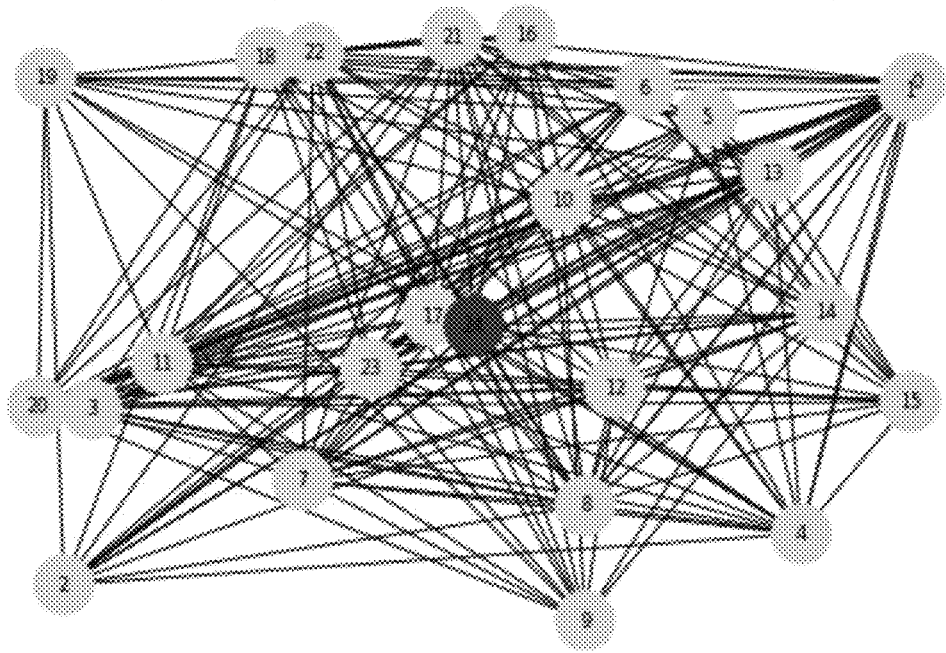
FIG. 16B illustrates a graphical representation of an area-of-interest of having 25 nodes and 0.6 connectivity, in accordance with an embodiment of the present invention.
Figure 16C:
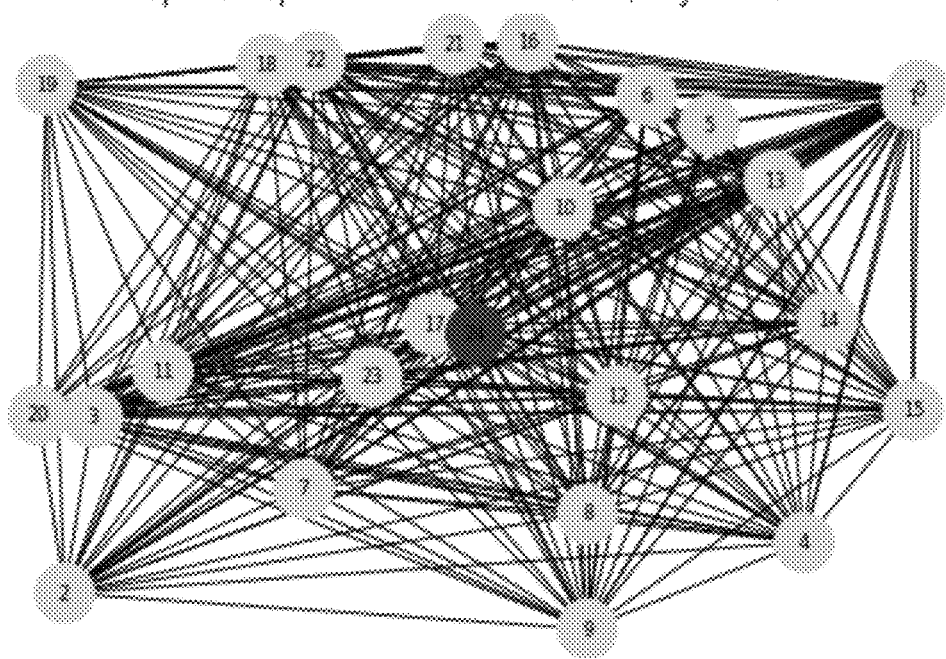
FIG. 16C illustrates a graphical representation of an area-of-interest of having 25 nodes and fully connected, in accordance with an embodiment of the present invention.

FIG. 16A is a graphical representation of the area-of-interest for the second experiment having 25 nodes and 0.3 connectivity. FIG. 16B is a graphical representation of the area-of-interest for the second experiment having 25 nodes and 0.6 connectivity. FIG. 16C is a graphical representation of the area-of-interest for the second experiment having 25 nodes and full connectivity.

FIG. 17 provides an analysis of the exploitability of the graph based on different possible starting nodes with 3 guards guarding the camera surveillance enabled area-of-interest for the second experiment.

Figure 18A:
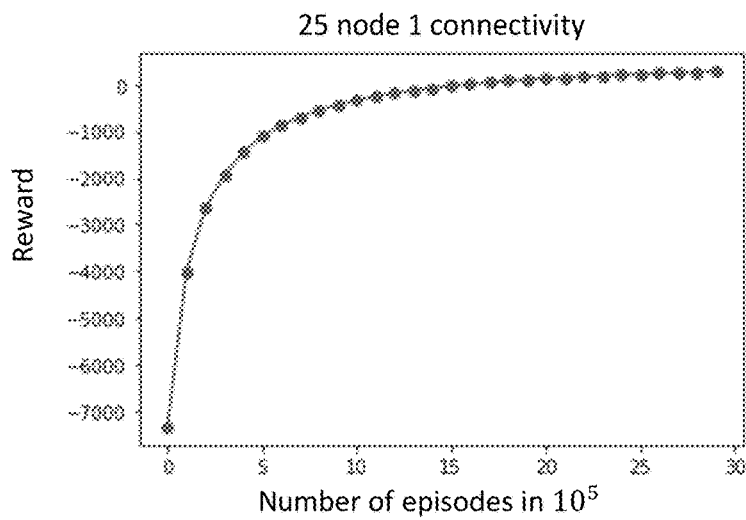
FIG. 18A is a graphical illustration of the moving average of collected rewards derived from the experiment shown in FIG. 16C and employing 3 guards for mitigation, in accordance with an embodiment of the present invention.
Figure 18B:
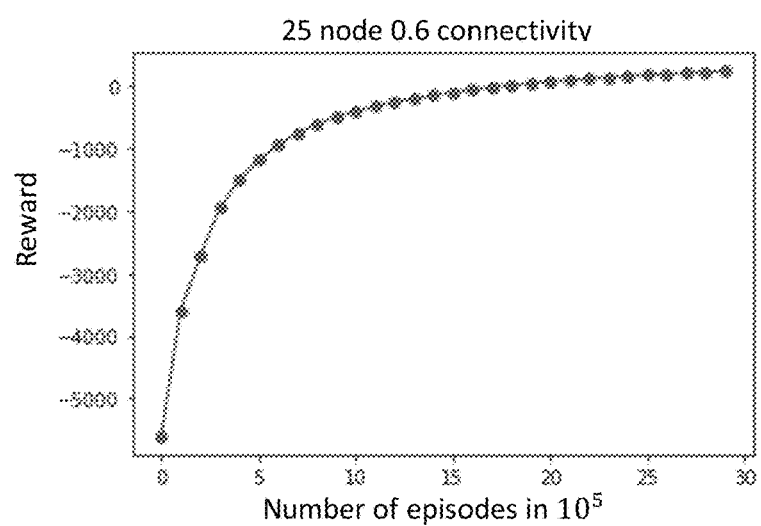
FIG. 18B is a graphical illustration of the moving average of collected rewards derived from the experiment shown in FIG. 16B and employing 3 guards for mitigation, in accordance with an embodiment of the present invention.
Figure 18C:
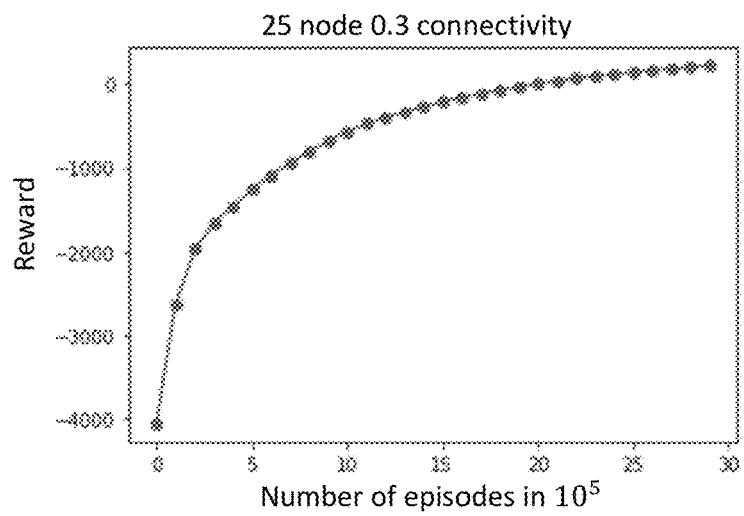
FIG. 18C is a graphical illustration of the moving average of collected rewards derived from the experiment shown in FIG. 16A and employing 3 guards for mitigation, in accordance with an embodiment of the present invention.

FIG. 18A provides an analysis of the moving average of reward accumulated by the agent in the 25-node area-of-interest with a connectivity of 1 and guarded by 3 guards. FIG. 18B provides an analysis of the moving average of reward accumulated by the agent in the 25-node area-of-interest with 0.6 connectivity and guarded by 3 guards. FIG. 18C provides an analysis of the moving average of reward accumulated by the agent in the 25-node area-of-interest with 0.3 connectivity and guarded by 3 guards.

Figure 19A:
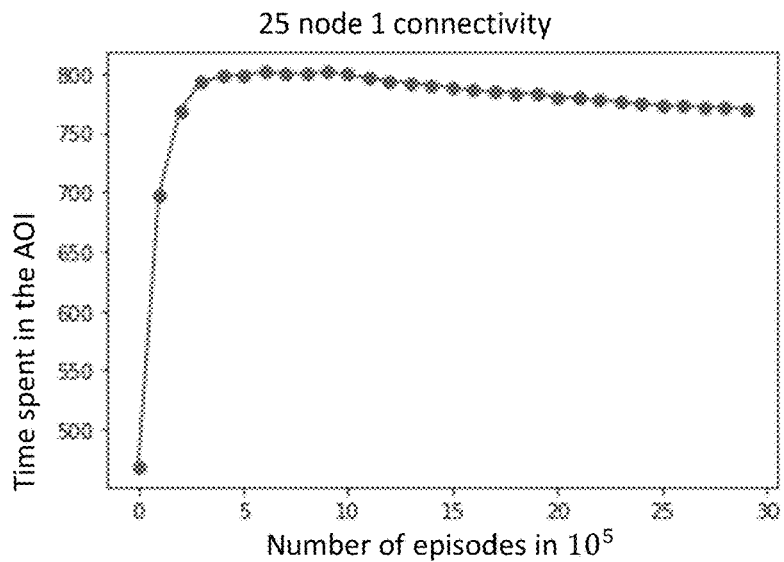
FIG. 19A is a graphical illustration of the time spent by the agent in the area-of-interest derived from the experiment shown in FIG. 16C and employing 3 guards for mitigation, in accordance with an embodiment of the present invention.
Figure 19B:
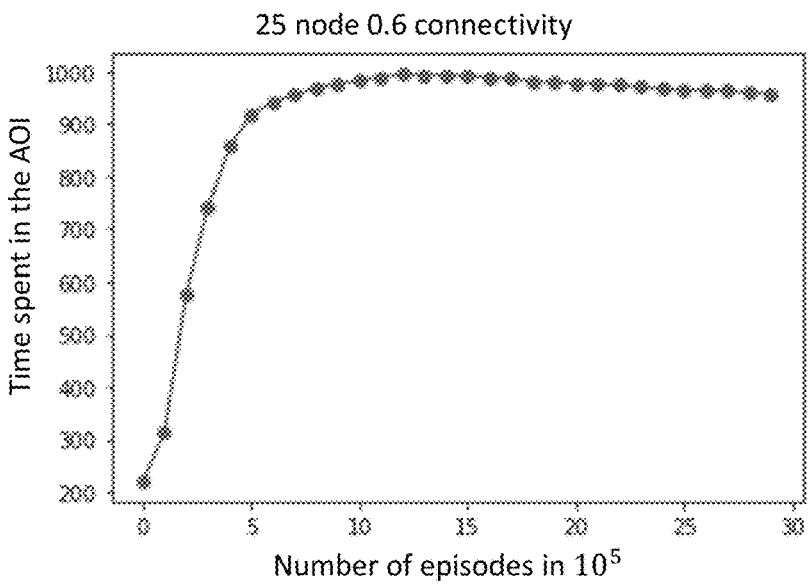
FIG. 19B is a graphical illustration of the time spent by the agent in the area-of-interest derived from the experiment shown in FIG. 16B and employing 3 guards for mitigation, in accordance with an embodiment of the present invention.
Figure 19C:
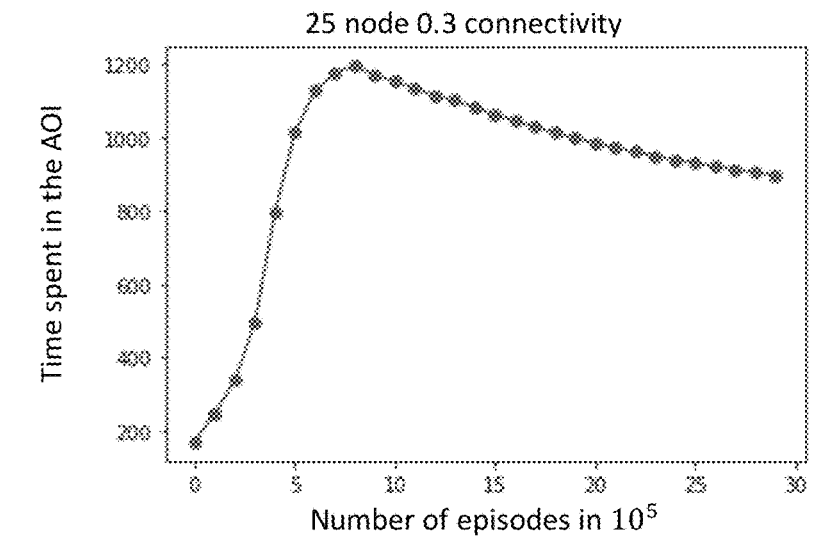
FIG. 19C is a graphical illustration of the time spent by the agent in the area-of-interest derived from the experiment shown in FIG. 16A and employing 3 guards for mitigation, in accordance with an embodiment of the present invention.

FIG. 19A provides an analysis of the moving average of time spent by the agent in the 25-node area-of-interest with a connectivity of 1 and guarded by 3 guards. FIG. 19B provides an analysis of the moving average of time spent by the agent in the 25-node area-of-interest with 0.6 connectivity and guarded by 3 guards. FIG. 19C provides an analysis of the moving average of time spend by the agent in the 25-node area-of-interest with 0.3 connectivity and guarded by 3 guards.

Figure 20A:
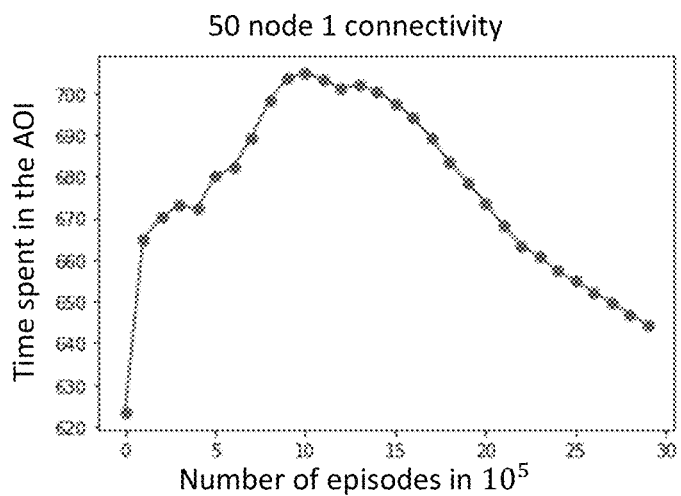
FIG. 20A is a graphical illustration of the time spent by the agent in the area-of-interest derived from an experiment having 50 nodes, being fully connected and employing 3 guards for mitigation, in accordance with an embodiment of the present invention.
Figure 20B:
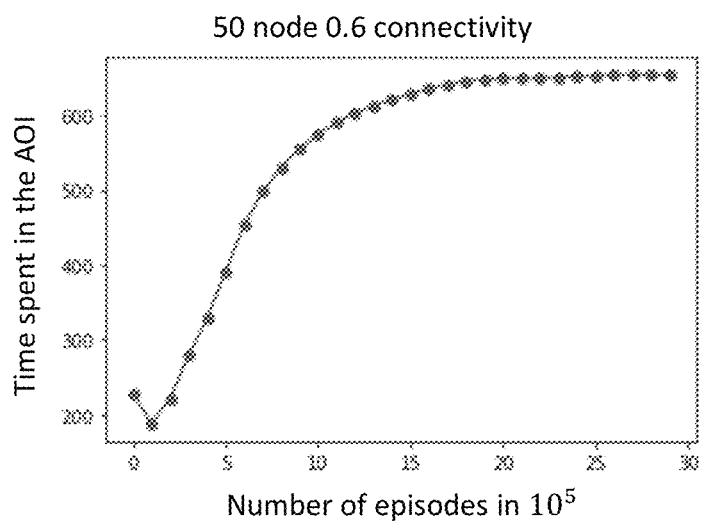
FIG. 20B is a graphical illustration of the time spent by the agent in the area-of-interest derived from the experiment having 50 nodes, 0.6 connectivity and employing 3 guards for mitigation, in accordance with an embodiment of the present invention.
Figure 20C:
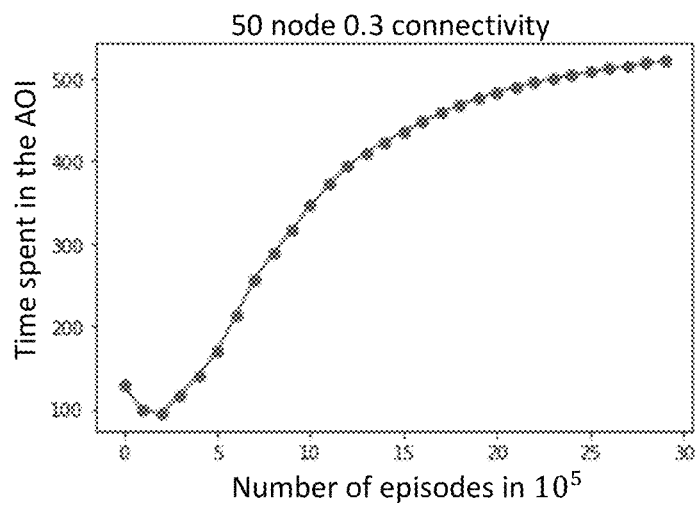
FIG. 20C is a graphical illustration of the time spent by the agent in the area-of-interest derived from the experiment having 50 nodes, 0.3 connectivity and employing 3 guards for mitigation, in accordance with an embodiment of the present invention.

FIG. 20A provides an analysis of the moving average of reward accumulated by the agent in the 50-node area-of-interest with a connectivity of 1 and guarded by 3 guards. FIG. 20B provides an analysis of the moving average of reward accumulated by the agent in the 50-node area-of-interest with 0.6 connectivity and guarded by 3 guards. FIG. 20C provides an analysis of the moving average of reward accumulated by the agent in the 50-node area-of-interest with 0.3 connectivity and guarded by 3 guards.

Figure 21A:
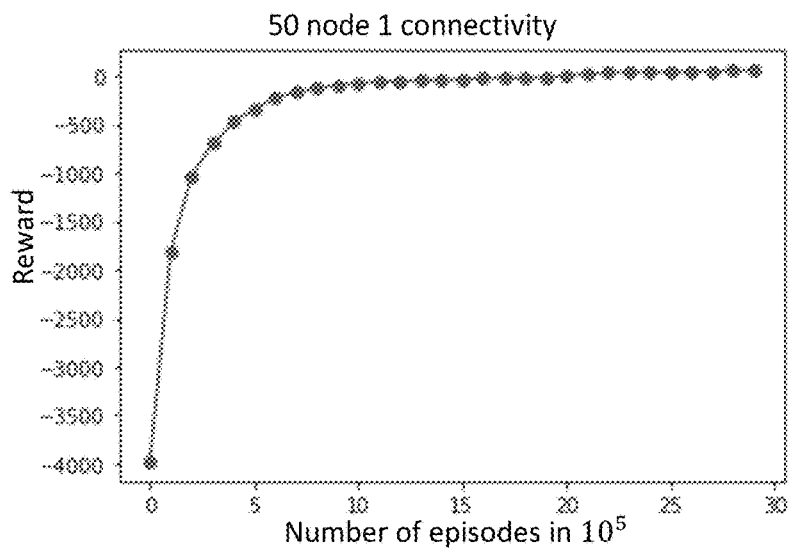
FIG. 21A is a graphical illustration of the moving average of collected rewards derived from the experiment having 50 nodes, being fully connected and employing 3 guards for mitigation, in accordance with an embodiment of the present invention.
Figure 21B:
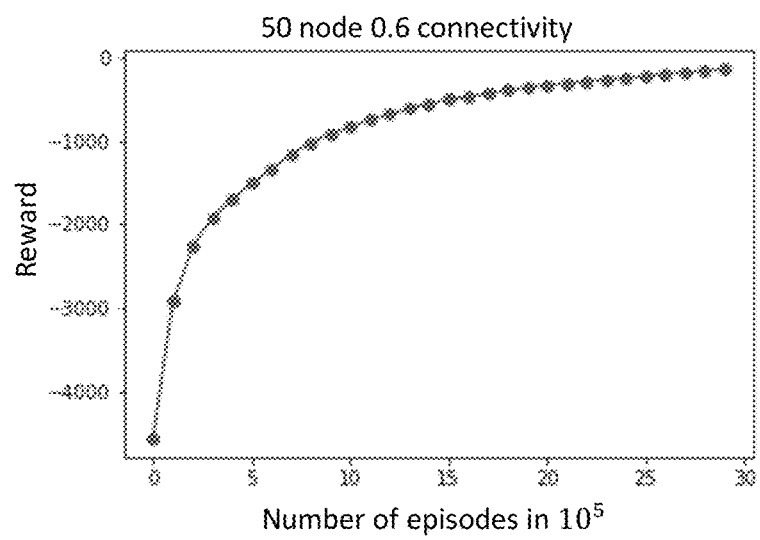
FIG. 21B is a graphical illustration of the moving average of collected rewards derived from the experiment having 50 nodes, 0.6 connectivity and employing 3 guards for mitigation, in accordance with an embodiment of the present invention.
Figure 21C:
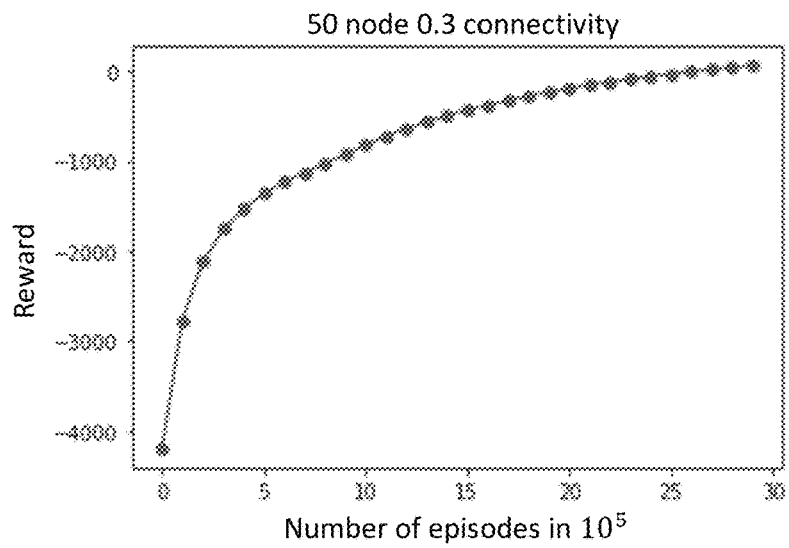
FIG. 21C is a graphical illustration of the moving average of collected rewards derived from the experiment having 50 nodes, 0.3 connectivity and employing 3 guards for mitigation, in accordance with an embodiment of the present invention.

FIG. 21A provides an analysis of the moving average of time spent by the agent in the 50-node area-of-interest with a connectivity of 1 and guarded by 3 guards. FIG. 21B provides an analysis of the moving average of time spent by the agent in the 50-node area-of-interest with 0.6 connectivity and guarded by 3 guards. FIG. 21C provides an analysis of the moving average of time spend by the agent in the 50-node area-of-interest with 0.3 connectivity and guarded by 3 guards.

From the first experiment it is shown that the possible attack paths and soft targets inside the area-of-interest change with intensity of guarding. Additionally, from the first experiment it can be observed that increasing guard numbers does not necessarily secure the network from all attacks, this presses the need of penetration testing to identify susceptible nodes and trajectories, which enables us to deploy/redeploy guards/cameras strategically to have a leak proof security posture.

The results of the second experiment help to gauge the efficacy and effectiveness of the proposed framework in different types of networks. In the second experiment it can be observed that increasing the network size reduces the efficacy of the proposed framework. Additionally, from the second experiment it can also be observed that sparsely connected networks are more difficult (time and complexity) to penetrate than densely/fully connected networks, irrespective of the network size.

The present invention may be embodied on various computing platforms that perform actions responsive to software-based instructions and most particularly on touch-screen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C #, C++, Visual Basic or the like and conventional procedural programming languages, such as the "C" programming language or similar programming languages.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

What is claimed is:

1. A method for reducing a threat footprint for an area-of-interest, the method comprising:
    identifying an area-of-interest, wherein the area-of-interest comprises one or more entry/exit points;
    determining a base risk score for the area-of-interest, wherein the base risk score considers one or more internal attributes of the area-of-interest and one or more external attributes of the area-of-interest;
    deriving a graphical representation of the area-of-interest and one or more defense strategies for the area-of-interest;
    training an adversarial reinforcement learning agent to identify one or more successful attack paths on the graphical representation of the area-of-interest that are effective in bypassing the one or more defense strategies for the area-of-interest;
    determining an active risk score based upon the one or more successful attack paths identified by the adversarial reinforcement learning agent; and
    determining one or more mitigation actions that will reduce the active risk score for the area-of-interest based upon the base risk score and one or more predetermined resource constraints, wherein reducing the active risk score reduces a threat footprint for the area-of-interest.

2. The method of claim 1, wherein determining the base risk score comprises:
    identifying critical level factors for the area-of-interest;
    identifying recovery level factors for the area-of-interest;
    identify protection level factors for the area-of-interest;
    identifying potential impact level factors for the area-of-interest;
    assigning weights to the critical level factors, the recovery level factors, the protection level factors and the potential impact level factors; and
    determining the base risk score based upon the weighted critical level factors, the recovery level factors, the protection level factors and the potential impact level factors.

3. The method of claim 2, wherein the critical level factors comprise one or more of a number of transit stations within the area-of-interest, a crime rate for the area-of-interest and a number of entry/exit points for the area-of-interest.

4. The method of claim 2, wherein the recovery level factors for the area-of-interest include a number of fire stations in the area-of-interest, a number of hospitals in the area-of-interest, a distance to the area-of-interest from the number of fire stations and the number of hospitals and a number of sprinkler systems in the area-of-interest.

5. The method of claim 2, wherein the protection level factors for the area-of-interest include a number of police stations in the area-of-interest and a distance to the area-of-interest from the number of police stations and a number of monitoring systems.

6. The method of claim 2, wherein the potential impact level factors include one or more of an expected density of people in the area-of-interest, a current protection status in the area-of-interest and a number of significant structures in the area-of-interest.

7. The method of claim 1, wherein the graphical representation of the area-of-interest comprises:
a plurality of vertices representing physical locations within or around the area-of-interest;
a plurality of edges connecting one or more vertices, the plurality of edges representing interconnections between the physical locations.

8. The method of claim 7, wherein the plurality of vertices comprises one or more entry points, exit points, central electric wiring locations, central plumbing locations, locations of guards, locations of barriers and locations of surveillance cameras.

9. The method of claim 7, wherein the plurality of edges comprises one or more streets and walkways.

10. The method of claim 1, wherein determining an active risk score based upon the one or more successful attack paths identified by the adversarial reinforcement learning agent comprises, monitoring the area-of-interest in real time.

11. A method for reducing a threat footprint for an area-of-interest, the method comprising:
identifying an area-of-interest, wherein the area-of-interest comprises one or more entry/exit points;
identifying one or more critical level factors, recovery level factors, protection level factors and potential impact level factors for the area-of-interest;
assigning weights to the one or more critical level factors, the recovery level factors, the protection level factors and the potential impact level factors;
determining a base risk score for the area-of-interest from the weighted one or more critical level factors, the recovery level factors, the protection level factors and the potential impact level factors;
deriving a graphical representation of the area-of-interest and one or more defense strategies for the area-of-interest;
training an adversarial reinforcement learning agent to identify one or more successful attack paths on the graphical representation of the area-of-interest that are effective in bypassing the one or more defense strategies for the area-of-interest;
determining an active risk score based upon the one or more successful attack paths identified by the adversarial reinforcement learning agent; and
determining one or more mitigation actions that will reduce the active risk score for the area-of-interest based upon the base risk score and one or more predetermined resource constraints, wherein reducing the active risk score reduces a threat footprint for the area-of-interest.

12. A non-transitory computer-readable medium, the computer-readable medium having computer-readable instructions stored thereon that, when executed by a computing device processor, cause the computing device to:
identify an area-of-interest, wherein the area-of-interest comprises one or more entry/exit points;
determine a base risk score for the area-of-interest, wherein the base risk score considers one or more internal attributes of the area-of-interest and one or more external attributes of the area-of-interest;
derive a graphical representation of the area-of-interest and one or more defense strategies for the area-of-interest;
train an adversarial reinforcement learning agent to identify one or more successful attack paths on the graphical representation of the area-of-interest that are effective in bypassing the one or more defense strategies for the area-of-interest;
determine an active risk score for a real-time situation in the area-of-interest based upon the one or more successful attack paths identified by the adversarial reinforcement learning agent; and
determine one or more mitigation actions that will reduce the active risk score for the area-of-interest based upon the base risk score and one or more predetermined resource constraints, wherein reducing the active risk score reduces a threat footprint for the area-of-interest.

13. The non-transitory computer-readable medium of claim 12, further causing the computing device to:
identify critical level factors for the area-of-interest;
identify recovery level factors for the area-of-interest;
identify protection level factors for the area-of-interest;
identify potential impact level factors for the area-of-interest;
assign weights to the critical level factors, the recovery level factors, the protection level factors and the potential impact level factors; and
determine the base risk score based upon the weighted critical level factors, the recovery level factors, the protection level factors and the potential impact level factors.

14. The non-transitory computer-readable medium of claim 13, wherein the critical level factors comprise one or more of a number of transit stations within the area-of-interest, a crime rate for the area-of-interest and a number of entry/exit points for the area-of-interest.

15. The non-transitory computer-readable medium of claim 13, wherein the recovery level factors for the area-of-interest include a number of fire stations in the area-of-interest, a number of hospitals in the area-of-interest, a distance to the area-of-interest from the number of fire stations and the number of hospitals and a number of sprinkler systems in the area-of-interest.

16. The non-transitory computer-readable medium of claim 13,
wherein the protection level factors for the area-of-interest include a number of police stations in the area-of-interest and a distance to the area-of-interest from the number of police stations and a number of monitoring systems.

17. The non-transitory computer-readable medium of claim 13, wherein the potential impact level factors include one or more of an expected density of people in the area-of-interest, a current protection status in the area-of-interest and a number of significant structures in the area-of-interest.

18. The non-transitory computer-readable medium of claim 12,
wherein the graphical representation of the area-of-interest comprises:
a plurality of vertices representing physical locations within or around the area-of-interest;
a plurality of edges connecting one or more vertices, the plurality of edges representing interconnections between the physical locations.

19. The non-transitory computer-readable medium of claim 18, wherein the plurality of vertices comprises one or more entry points, exit points, central electric wiring locations, central plumbing locations, locations of guards, locations of barriers and locations of surveillance cameras.

20. The non-transitory computer-readable medium of claim 18, wherein the plurality of edges comprises one or more streets and walkways.

\* \* \* \* \*